United States Patent
Miwa et al.

(10) Patent No.: US 7,416,693 B2
(45) Date of Patent: Aug. 26, 2008

(54) MOLDING MANUFACTURING METHOD AND APPARATUS

(75) Inventors: Yoshikazu Miwa, Aichi (JP); Akira Jinno, Aichi (JP); Masahito Yamada, Aichi (JP); Junichi Miyake, Aichi (JP); Tatsuya Tamura, Aichi (JP)

(73) Assignee: Tokai Kogyo Co., Ltd., Aichi (JP)

( * ) Notice: Subject to any disclaimer, the term of this patent is extended or adjusted under 35 U.S.C. 154(b) by 309 days.

(21) Appl. No.: 10/720,081

(22) Filed: Nov. 25, 2003

(65) Prior Publication Data

US 2004/0156941 A1    Aug. 12, 2004

(30) Foreign Application Priority Data

Nov. 26, 2002 (JP) .................. P. 2002-342648
Nov. 26, 2002 (JP) .................. P. 2002-342649
Dec. 17, 2002 (JP) .................. P. 2002-365393

(51) Int. Cl.
B29C 59/16 (2006.01)
B29C 47/04 (2006.01)
B29C 53/04 (2006.01)

(52) U.S. Cl. .................. 264/480; 264/172.15; 264/320; 264/319

(58) Field of Classification Search .................. 156/192, 156/216, 212; 264/480
See application file for complete search history.

(56) References Cited

U.S. PATENT DOCUMENTS 2,500,895 A * 3/1950 Davies .................. 156/443
3,553,301 A * 1/1971 Reardon et al. .................. 264/46.6
3,655,173 A * 4/1972 Costello .................. 432/5
3,830,680 A * 8/1974 Loy .................. 156/480
4,035,224 A * 7/1977 Anderson .................. 156/475
4,385,090 A * 5/1983 Sims .................. 428/121

(Continued)

FOREIGN PATENT DOCUMENTS

JP    03-274587    12/1991

(Continued)

OTHER PUBLICATIONS

Japanese Office Action mailing date: Oct. 4, 2005 with English translation issued for corresponding Japanese Application No. JP-A-2002-342649.

(Continued)

*Primary Examiner*—Monica A Huson
(74) *Attorney, Agent, or Firm*—Westerman, Hattori, Daniels & Adrian, LLP.

(57) ABSTRACT

A molding manufacturing method includes: preparing a molding body including a molding main body made of thermoplastic material and a decorative layer higher than the molding main body in hardness and melt temperature; setting the molding body in a fixed die; heating and softening an end portion of the molding body while maintaining the decorative layer softer than the molding main body, by irradiating an infrared ray onto a back surface of the molding main body corresponding to the end portion; and press forming the end portion of the molding body by applying a movable punch onto the fixed die while the end portion of the molding body is in a softened state to bend the end portion of the molding body to obtain an end cover portion having a predetermined shape.

20 Claims, 21 Drawing Sheets

U.S. PATENT DOCUMENTS 4,864,786 A * 9/1989 Harris, Jr. .................. 52/214
6,186,765 B1 * 2/2001 Ide et al. .................. 425/297

FOREIGN PATENT DOCUMENTS

| | | |
|---|---|---|
| JP | 09-254277 | 9/1997 |
| JP | 98-6152 | 9/1998 |
| JP | 11-105157 | 4/1999 |
| JP | 11-156878 | 6/1999 |
| JP | 11-235751 | 8/1999 |
| JP | 11-240034 | 9/1999 |
| JP | 2966315 | 10/1999 |
| JP | 2000-280834 | 10/2000 |
| JP | 2001-088155 | 4/2001 |

OTHER PUBLICATIONS

Japanese Office Action mailing date: Oct. 4, 2005 with English translation issued for corresponding Japanese Application No. JP-A-2002-342648.

* cited by examiner

MOLDING MANUFACTURING METHOD AND APPARATUS

BACKGROUND OF THE INVENTION

1. Field of the Invention

The present invention relates to a molding manufacturing method and apparatus for manufacturing a molding having an end cover portion with a predetermined shape out of a long molding body of thermoplastic material by the extrusion molding, by press forming an end portion of the molding body.

2. Background Art

When the press working (bending) is applied to the end portion of the molding body (molding material) made of thermoplastic material in the ordinary temperature condition without heating or softening the end portion, the bending portion may be damaged or may not be formed into a predetermined bent shape due to the elastic restoring force thereof.

Conventionally, it is therefore normal that the press working (bending) is applied to the end portion of the molding body while heating and softening the end portion by the heating device, so that the molding having the end cover portion with a predetermined shape is manufactured (For example, see Japanese Patent No. 2966315 (pages 2 to 3, FIGS. 1 to 9) and JIII Journal of Technical Disclosure No. 98-6152).

Meanwhile, in the molding manufacturing method of applying the press working to the end portion of the molding body made of thermoplastic material in the condition that such end portion is heated and softened, a decorative surface of the end portion of the molding body is also heated and softened. Therefore, in the molding (molding product) formed of the molding body, there arises a problem that scratches such as unevenness may occur on the decorative surface of the end cover portion or its neighborhood and thus its outward appearance is worsened.

The present invention has been made in view of the above problem. It is an object of the present invention to provide molding manufacturing method and apparatus capable of satisfactorily forming an end portion of a molding body by the press working and thus preventing occurrence of the distortions such as unevenness on the decorative surface of the end cover portion and its neighborhood formed in this manner.

SUMMARY OF THE INVENTION

To achieve the object, the invention provides a molding manufacturing method, including: preparing a long molding body including a molding main body made of thermoplastic material and a decorative layer higher than the molding main body in hardness and melt temperature, the molding main body and the decorative layer formed integrally so that the decorative layer is provided along a longitudinal direction of the molding main body on a surface thereof; setting the molding body in a fixed die; heating and softening an end portion of the molding body while maintaining a condition in which the decorative layer is harder than the molding main body, by irradiating an infrared ray onto a back surface of the molding main body corresponding to the end portion of the molding body; and press forming the end portion of the molding body by pressing a movable punch onto the fixed die while the end portion of the molding body is in a heated and softened state to bend the end portion of the molding body to obtain an end cover portion having a predetermined shape.

According to the invention, since the near infrared ray is irradiated onto the back surface side of the molding main body that corresponds to the end portion of the molding body, the end portion of the molding body can be heated and softened satisfactorily while keeping the temperature of the decorative layer side lower than the temperature of the back surface side and also keeping a state that a softened level of the decorative layer is still lower than the molding main body. In addition, it can be prevented that the normal portions except the end portion of the molding body are heated and softened and thermally deformed unexpectedly.

As a result, the decorative layer is not excessively heated, damages caused by contacting to the molding mold can be prevented, and the pleasant decorative layer can be still maintained.

Also, because the near infrared heating is employed, the heating of the end portion of the molding body can be easily controlled by the electrical control. In addition, the partial areas that need the heating can be heated precisely in proper quantities.

Preferably, in the heating and softening step, an irradiation amount of the infrared ray onto the back surface of the molding main body is made alternately increase and decrease with a lapse of time.

According to the invention, the infrared ray is irradiated onto the back surface side of the molding main body in the end portion of the molding body while changing an irradiation amount of the infrared ray to increase and decrease alternately with a lapse of time. Therefore, the back surface side of the end portion of the molding body is heated by the heat radiation and the surface side (decorative layer side) is heated by the thermal conduction from the back surface side. At this time, since the back surface side is never heated excessively, such disadvantages can be prevented that the back surface of the end portion of the molding body is heated excessively and melt away, a burn occurs, etc.

Preferably, in the heating and softening step, a near infrared ray is irradiated by the use of a near infrared heating device.

Therefore, the molding main body in the end portion of the molding body can be heated and softened quickly by a penetrating energy, which is one characteristic of the near infrared ray, from the back surface to the inner side.

Preferably, the near infrared heating device includes a near infrared lamp and a reflecting mirror for reflecting a light emitted from the near infrared lamp to form a focal point; and the near infrared ray is irradiated substantially uniformly onto the back surface of the molding main body from a position separated farther than a focal length of the reflecting mirror.

According to the invention, since the near infrared ray is irradiated almost uniformly onto the back-surface side area of the molding main body, the molding main body can be heated and softened substantially uniformly over the almost full length of the end portion of the molding body. Also, the energy required of the heating can be used effectively.

The invention provides a molding manufacturing method including: preparing a long molding body including a molding main body made of thermoplastic material and a decorative layer higher than the molding main body in hardness and melt temperature, the molding main body and the decorative layer formed integrally so that the decorative layer is provided along a longitudinal direction of the molding main body on a surface thereof; setting the molding body in a fixed die; heating and softening an end portion of the molding body while maintaining a condition in which the decorative layer is harder than the molding main body; and press forming the end portion of the molding body by moving the movable punch obliquely toward the fixed die along a predetermined excursion such that the movable punch fits with the fixed die at an end of the excursion, to bend the end portion of the molding body.

The invention provides a molding manufacturing method including: extrusion molding a molding body including a molding main body, a leg portion and a pair of protruding portions, the molding main portion integrally laminated with a decorative layer harder than the molding main body, the leg portion protruding from a back surface of the molding main body, the pair of protruding portions each protruding from one of both sides of the leg portion in a width direction of the molding main body; cutting the molding body into a cut piece having a predetermined length; removing the protruding portions from a back side of an end portion of the cut piece to form a first region thereon; removing the protruding portions and the leg portion from a second region consecutive with a distal side of the first region to form a step between the first region and the second region on the back side; positioning the cut piece in a longitudinal direction thereof by bringing the step into contact with the fixed die; heating and softening an end portion of the cut piece while maintaining a condition in which the decorative layer is harder than the molding main body, by irradiating an infrared ray onto a back surface of the molding main body corresponding to the end portion of the molding body; and press forming the end portion of the cut piece by pressing a movable punch onto the fixed die while the end portion of the cut piece is in a heated and softened state to bend the end portion of the cut piece to obtain an end cover portion having a predetermined shape.

The invention provides a molding manufacturing apparatus, including: a fixed die into which a molding body is to be set; a movable plate arranged movably in forward and backward directions substantially perpendicular to a reference line along a longitudinal direction of the molding body set in the fixed die; a movable punch attached on the movable plate and guided movably in forward and backward directions substantially perpendicular to a moving direction of the movable plate; and a driving mechanism for driving the movable punch to move forward when the movable plate is moved forward; wherein the movable punch is moved in an oblique direction to close the fixed die therewith to press form an end portion of the molding body, the oblique direction being a synthesized direction of a forward moving direction of the movable plate and a forward moving direction of the movable punch.

Preferably, the driving mechanism includes a driving source and a linking member which transmits a driving force of the driving source to the movable punch to shift the movable punch.

Preferably, the driving mechanism includes a cam mechanism having a cam follower and a cam groove.

Preferably, each of the fixed die and the movable punch has a forming surface for pressing the end portion of the molding body to bend at a substantially right angle.

Preferably, each of the fixed die and the movable punch has a forming surface for pressing the end portion of the molding body to bend at an acute angle or an obtuse angle.

The invention provides a molding manufacturing method for manufacturing a molding having an end cover portion shaped in a predetermined shape out of a long molding body, comprising preparing a molding apparatus including a fixed die, a first movable punch to be used to close the fixed die, and a second movable punch, the fixed die having a back forming surface for forming aback surface of the end cover portion, the first movable punch having a front forming surface for forming a front surface of the end cover portion, and the second movable punch capable of changing a volume of a cavity formed between the front forming surface and the back forming surface; setting the molding body in the fixed die in a state that an end portion of the molding body protrudes from an end of the fixed die; heating and softening the end portion; moving the first movable punch to close the fixed die therewith, while bringing the first movable punch into contact with the end portion to bend the end portion in a back surface side thereof, to form an end bending portion in the cavity; and moving the second movable punch so as to reduce the volume of the cavity to apply a compressive force to the end bending portion to press a material forming the end bending portion closely onto the front and back surfaces, while keeping the vicinity of a bending center portion of the end bending portion in a fluid.

According to the invention, the end portion of the molding forming portion is bent toward the back surface side by moving forward the first movable punch. Then, the end bending portion is formed by the end portion in the cavity between both forming surfaces of the fixed die and the first movable punch.

Then, the compressive force is applied to the end bending portion by moving the second movable punch in the direction that reduces a volume of the cavity. Thus, the material constituting the end bending portion is compressed and filled in the cavity, and pushed tightly against the forming surface of the mold to transfer a shape of the forming surface to the material, whereby the end cover portion is formed.

Since the end cover portion is formed in this manner, occurrence of the uneven distortion on the surface (decorative surface) of the end cover portion can be prevented. Therefore, the molding having the end cover portion with the good-looking appearance can be manufactured effectively.

Preferably, the first movable punch has an internal angle portion formed continuously with the front forming surface and having a radius of curvature smaller than a radius of curvature of a surface of the end bending portion.

According to the invention, when the end portion of the molding body is bent toward the back surface side by the forward moving motion of the first movable punch, such end portion is bent upon the back surface side as the bending center and thus the surface side of the end portion is extended in the longitudinal direction. Then, the surface side of the end bending portion is bent with a radius of curvature that is larger than a radius of curvature of the internal angle portion of the first movable punch. For this reason, a clearance is generated between the internal angle portion of the first movable punch and the surface of the bent portion of the end bending portion.

After the end bending portion is formed, the second movable punch is moved in the direction that reduces a volume of the cavity during when at least the neighborhood of the bending center portion of the end bending portion is kept in its fluid state. As a result, the compressive force is applied to the end bending portion and then the material of the end bending portion flows into the clearance on the inner side of the internal angle portion of the first movable punch to contact tightly it. Then, the material of the end bending portion is cooled and solidified in this condition, whereby the end cover portion having a sharp edge portion that coincides with a shape of the internal angle portion of the first movable punch is formed.

Preferably, the step of moving the second movable punch includes: moving forward the second movable punch from a distal end of the end bending portion in a direction to shorten a length of the end bending portion.

Therefore, the material of the end bending portion can be compressed effectively by the forward moving motion of the second movable punch.

Preferably, in the step of moving the first movable punch, the end portion is bent while a temperature of a distal end of the ending bending portion is reduced than a temperature of a bending center of the ending portion.

Preferably, in the step of moving the first movable punch, the end portion is bent while a hardness of a distal end of the ending portion is higher than a hardness of a bending center of the ending portion.

According to the invention, when the end portion of the molding forming portion is bent in the cavity by the forward moving motion of the first movable punch to form the end bending portion and then the second movable punch is moved forward and the pushing surface at its top end comes into contact with the material of the top end of the end bending portion, the hardness of the top end side of the end bending portion is kept high rather than the neighborhood of the center portion. Accordingly, leakage of the material in the neighborhood of the top end portion of the end bending portion to the outside of the cavity can be prevented. In other words, the material of the end bending portion can be compressed without shortage, and thus the end cover portion having a pleasant external appearance can be formed by preventing disadvantages caused due to lack of the compressive force.

Preferably, in the setting step, the protruding end portion of the molding body is set longer than a length of the end cover portion to be finally formed and shorter than a length of the front forming surface of the first movable punch; in the step of moving the first movable punch, the first movable punch closes the fixed die so that an end of the end bending portion remains in the cavity; and, in the step of moving the second movable punch, the second movable punch is moved toward apart of the cavity opposing to the end of the bending portion.

The invention provides a molding manufacturing apparatus for manufacturing a molding having an end cover portion shaped in a predetermined shape out of a long molding body, including: a fixed die having a back forming surface for forming a back surface of the end cover portion; a first movable punch to be used to close the fixed die, the first movable punch having a front forming surface for forming a front surface of the end cover portion; and a second movable punch capable of changing a volume of a cavity formed between the front forming surface and the back forming surface.

Preferably, the first movable punch has an internal angle portion being formed continuously with the front forming surface and having a radius of curvature smaller than a radius of curvature of a surface of an end bending portion of the molding body, the end bending portion to be formed into the end cover portion.

According to the invention, when the material of the end bending portion is compressed by moving the second movable punch, a part of the material is filled into the clearance on the inner side of the internal angle portion of the first movable punch and is pushed tightly against the forming surface. Hence, the end cover portion having a sharp edge portion, which coincides with a shape of the internal angle portion of the first movable punch, can be formed easily.

Preferably, the second movable punch is guided by the back forming surface of the fixed die, to move forward and backward while being in contact therewith; and the volume of the cavity is reduced by a forward moving motion of the second movable punch.

According to the invention, the second movable punch can be guided forward and backward while using the forming surface of the fixed die as the guiding surface. In other words, dedicated guiding members for guiding forward and backward the second movable punch can be omitted, and thus reduction in cost can be achieved by simplifying the mold structure correspondingly.

Preferably, the molding manufacturing apparatus further includes: a heating unit which is provided to the fixed die and heats the back surface of the end portion.

According to the invention, the end portion of the molding body can be heated from the back surface side in the state that the molding body is set in the fixed die. Also, the end portion of the molding body can be softened by heating precisely the necessary area only. For this reason, the time and labor for heating the end portion of the molding body previously at another place (by separate steps) can be eliminated, and also the disadvantages caused by the unexpected deformation of the end portion that is softened by the heating do not occur.

BRIEF DESCRIPTION OF THE DRAWINGS

The present invention may be more readily described with reference to the accompanying drawings.

DETAILED DESCRIPTION OF THE PREFERRED EMBODIMENTS

Embodiment 1

An embodiment 1 of the present invention will be explained with reference to FIG. 1 to FIG. 15 hereinafter.

Figure 1:
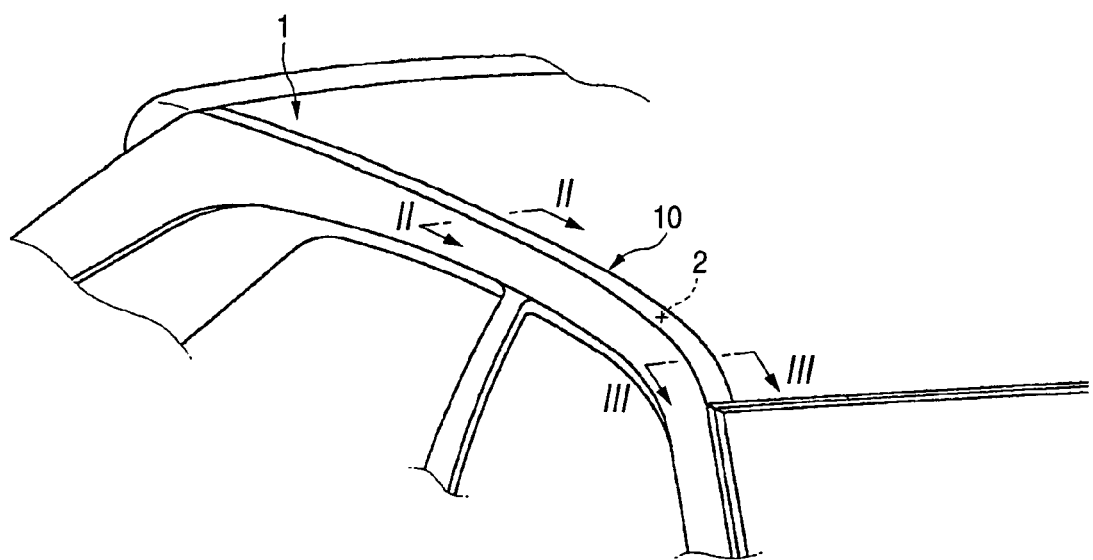
FIG. 1 is a perspective view showing a state that a molding according to an embodiment 1 of the present invention is fitted onto a top surface of a roof panel of a vehicle.
Figure 2:
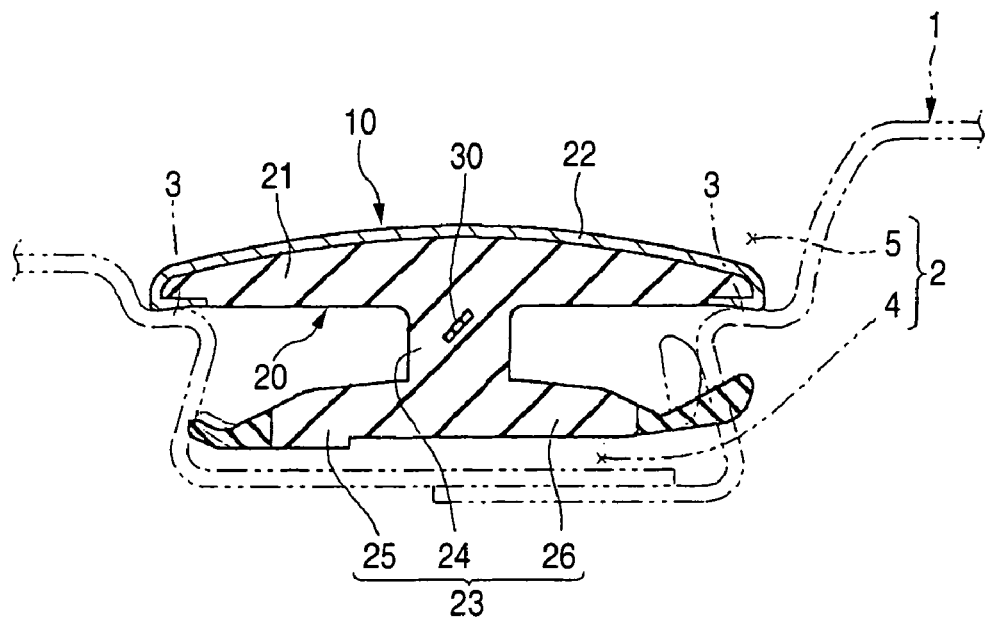
FIG. 2 is a cross sectional view taken along II-II line in FIG. 1.
Figure 3:
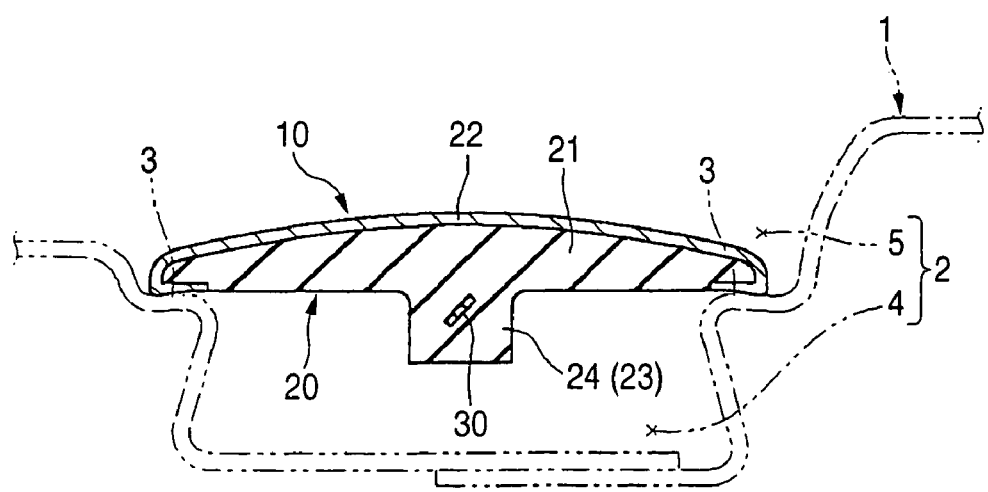
FIG. 3 is a cross sectional view taken along III-III line in FIG. 1.
Figure 4:
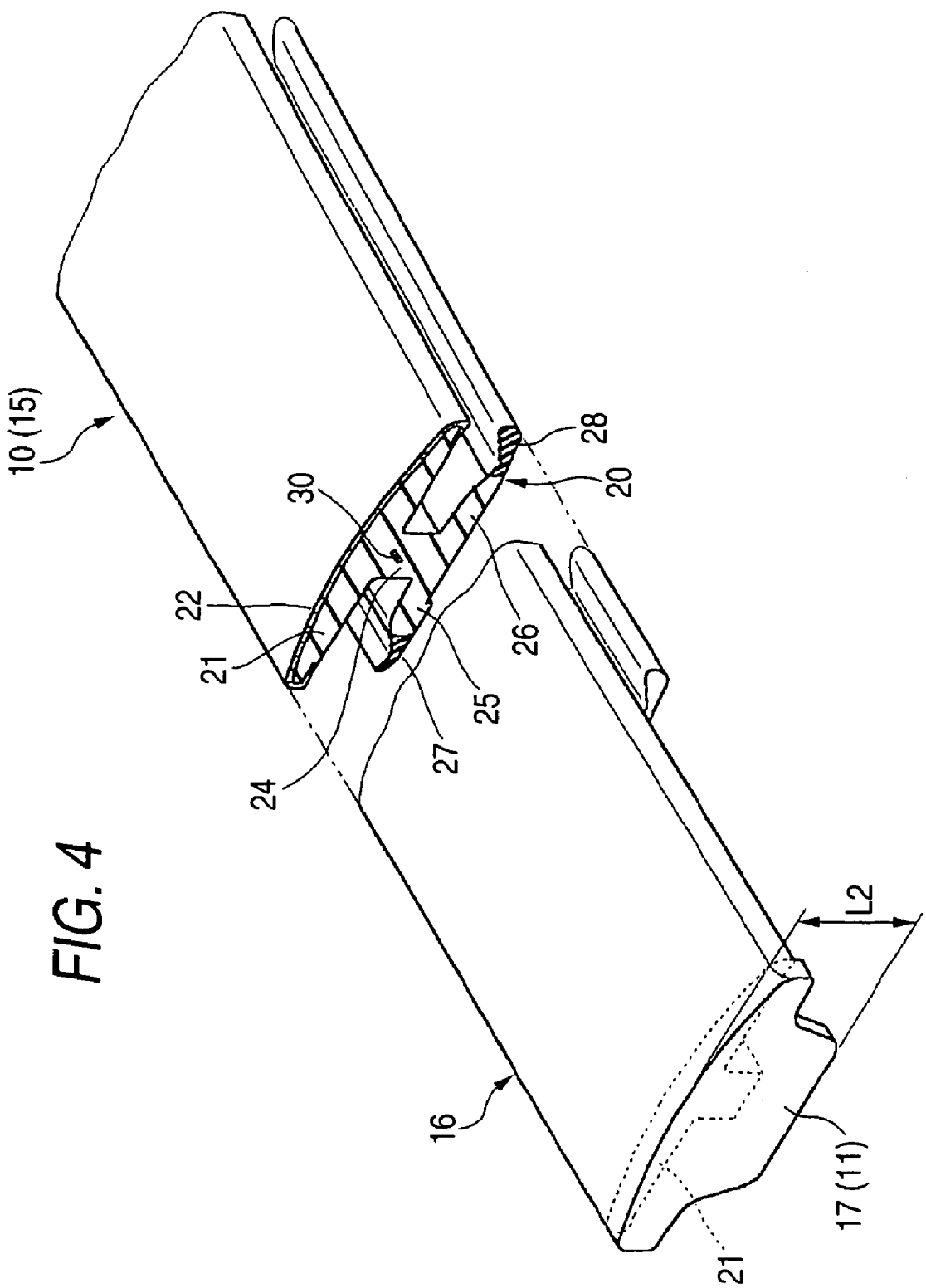
FIG. 4 is a perspective view showing the molding that is partially broken.

FIG. 1 is a perspective view showing a state that a molding is fitted onto a top surface of a roof panel of a vehicle. FIG. 2 is a cross sectional view taken along a II-II line in FIG. 1. FIG. 3 is a cross sectional view taken along a III-III line in FIG. 1. FIG. 4 is a perspective view showing the molding that is partially broken.

As shown in FIG. 1 to FIG. 3, a molding fitting groove 2 that is extended in the longitudinal direction to fit a molding (roof side molding, in this embodiment) 10 therein is provided to both side portions of a roof panel 1 of a vehicle. This molding fitting groove 2 is formed like a stepped groove that has a stepped surface 3 near its upper portion. Then, the molding fitting groove 2 includes a lower groove portion 4 having an almost dovetail-grove like cross sectional shape as its lower portion, and an upper groove portion 5 having the stepped surface 3 as a bottom portion in the upper opening of the lower groove portion 4 respectively.

As shown in FIG. 4, the molding 10 that has integrally an end cover portion 11 at its end portion in the longitudinal direction is manufactured by bending an end portion 17 of a molding body 15, which is the longitudinally-extending extrusion-molded material shown in FIG. 5 to FIG. 8, by means of the press working.

Also, as shown in FIG. 5 to FIG. 8, the molding body 15 is formed of hard (a Durometer hardness based on JIS-K7215 is almost HDA 80 to 100) thermoplastic material (e.g., thermoplastic synthetic resin, thermoplastic elastomer, or the like) by the extrusion molding to extend longitudinally. The molding body 15 includes integrally a molding main body 20 to be fitted along the molding fitting groove 2, and a hard (a Durometer hardness based on JIS-K7215 is almost HDD 40 to 60) decorative layer 22 provided along the longitudinal direction of the molding main body 20 on the surface side and formed of thermoplastic material whose hardness and melt temperature are higher than the molding main body 20.

Also, in this embodiment, the molding main body 20 includes integrally an ornament body 21 and a supporting body 23 in its cross section. Then, the decorative layer 22 is provided along the longitudinal direction of the ornament body 21 on the surface side in a layered fashion.

This decorative layer 22 may be formed integrally by the co-extrusion at the same time when the molding main body 20 is formed by the extrusion molding. Also, the decorative layer 22 may be formed of the material having the above characteristic previously like a tape, then the tape-like decorative layer 22 may be supplied to the extrusion molding die used to mold the molding main body 20, and then such decorative layer 22 may be pasted onto a surface of the ornament body 21 at the same time when the molding main body 20 is formed by the extrusion molding. Thus, the decorative layer 22 maybe formed integrally along the longitudinal direction of the molding main body 20 (ornament body 21) on the surface side.

Also, the supporting body 23 of the molding main body 20 includes integrally a leg portion 24 formed to extend downward from a back surface of the ornament body 21, and projected portions 25, 26 projected leftward and rightward from a lower end of the leg portion 24 respectively. In addition, elastic lips 27, 28 made of resilient and soft (a Durometer hardness based on JIS-K7215 is almost HDA 60 to 80) non-foaming thermoplastic material or foaming thermoplastic material, which is deformed elastically to be pushed against both groove wall surfaces of the lower groove portion 4 of the molding fitting groove 2, are extended from top end portions of the projected portions 25, 26 respectively.

Also, in this embodiment 1, a core material 30 made of a metal strip, a metal wire, or the like is embedded (inserted) near a root portion of the leg portion 24. This core material 30 is continuous in the longitudinal direction of the molding main body 20 and has the rigidity larger than the main body material to prevent the expansion and contraction of the molding main body 20.

Figure 5:
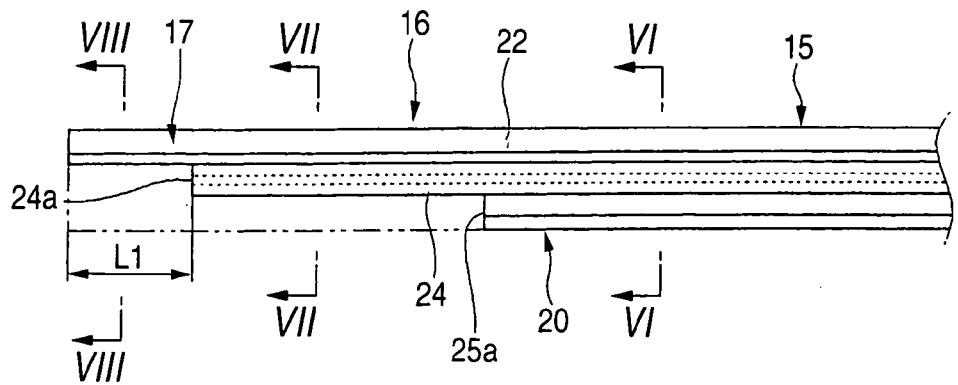
FIG. 5 is a side view showing a normal portion to an end portion of a molding body.
Figure 6:
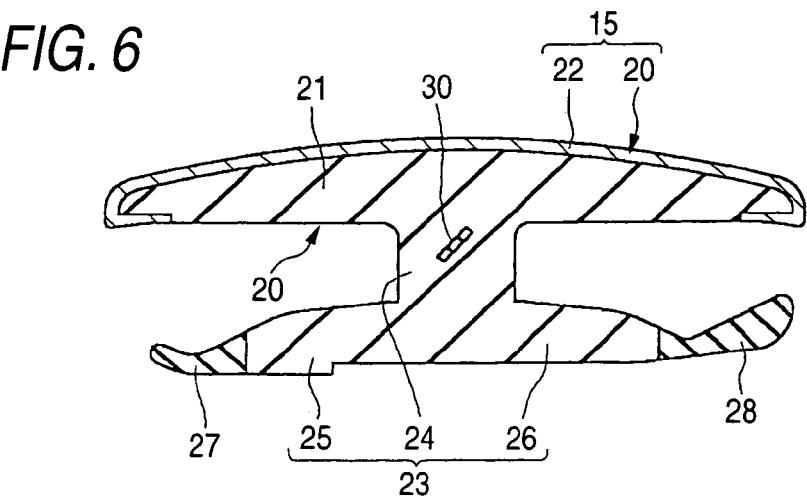
FIG. 6 is a cross sectional view of the normal portion of the molding body, taken along VI-VI line in FIG. 5.
Figure 7:
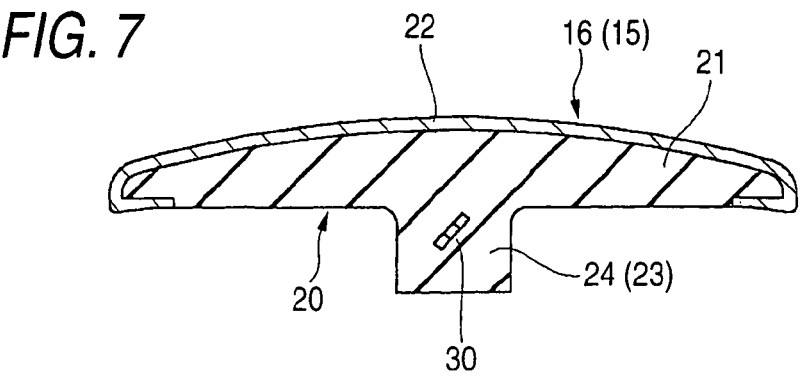
FIG. 7 is a cross sectional view of an end portion neighborhood of the molding body, taken along VII-VII line in FIG. 5.

As shown in FIG. 5 and FIG. 7, other portions, i.e., a lower half portion of the leg portion 24 and the projected portions 25, 26, except the neighborhood of the root portion in which the core material 30 of the leg portion 24 is embedded are removed from the supporting body 23 of the molding main body 20 by the cutting, or the like over the range from an end portion neighborhood 16 to the end portion 17 of the molding body 15.

Figure 8:
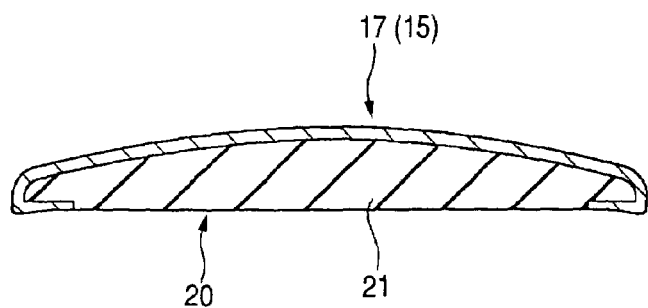
FIG. 8 is a cross sectional view of the end portion of the molding body, taken along a VIII-VIII line in FIG. 5.

Also, as shown in FIG. 5 and FIG. 8, the end portion 17 of the molding body 15 has a predetermined length dimension enough to form the end cover portion 11. Also, a remaining portion, i.e., an upper half portion of the leg portion 24 is removed from the end portion 17 by the cutting, or the like to leave the ornament body 21 of the molding main body 20.

Next, a molding manufacturing system for manufacturing the molding 10 by applying the press working (bending) to the end portion 17 of the above molding body 15 will be explained with reference to FIG. 9 and FIG. 10 hereinafter.

Figure 9:
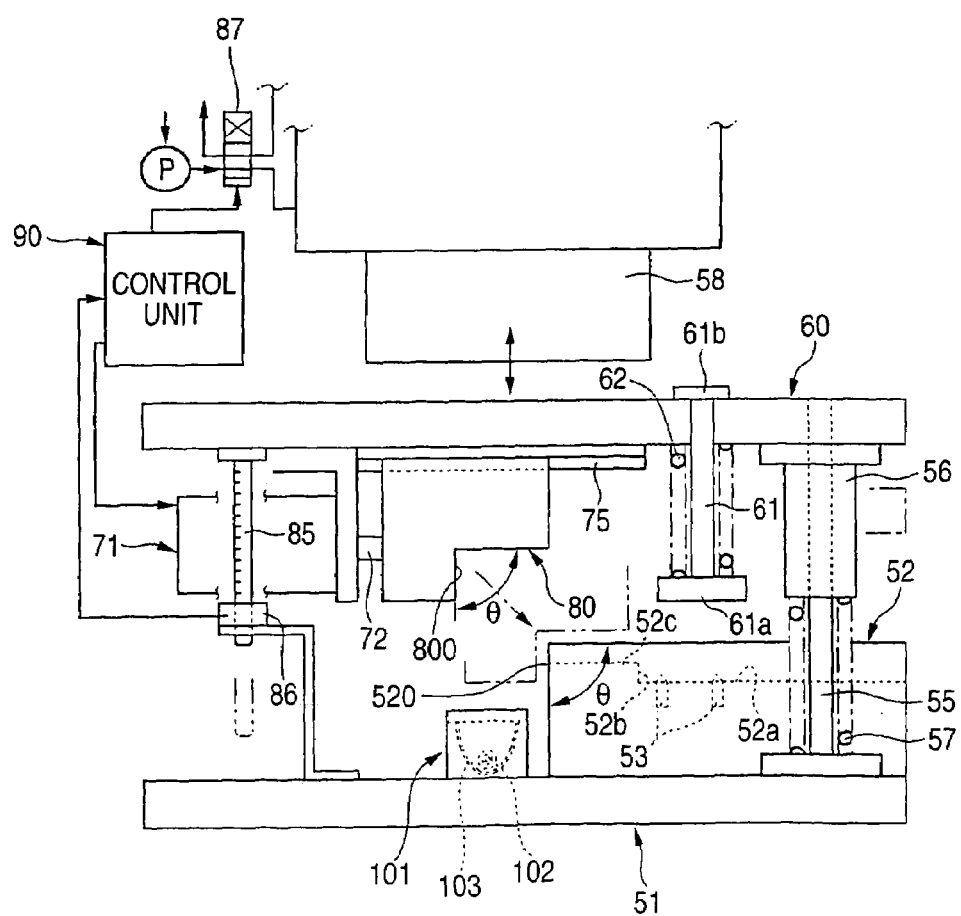
FIG. 9 is an explanatory view showing an overall configuration of the molding manufacturing system in a simplified fashion.

FIG. 9 is an explanatory view showing an overall configuration of the molding manufacturing system in a simplified fashion. FIG. 10 is an explanatory view showing a state that the molding body is set in the fixed die.

Figure 10:
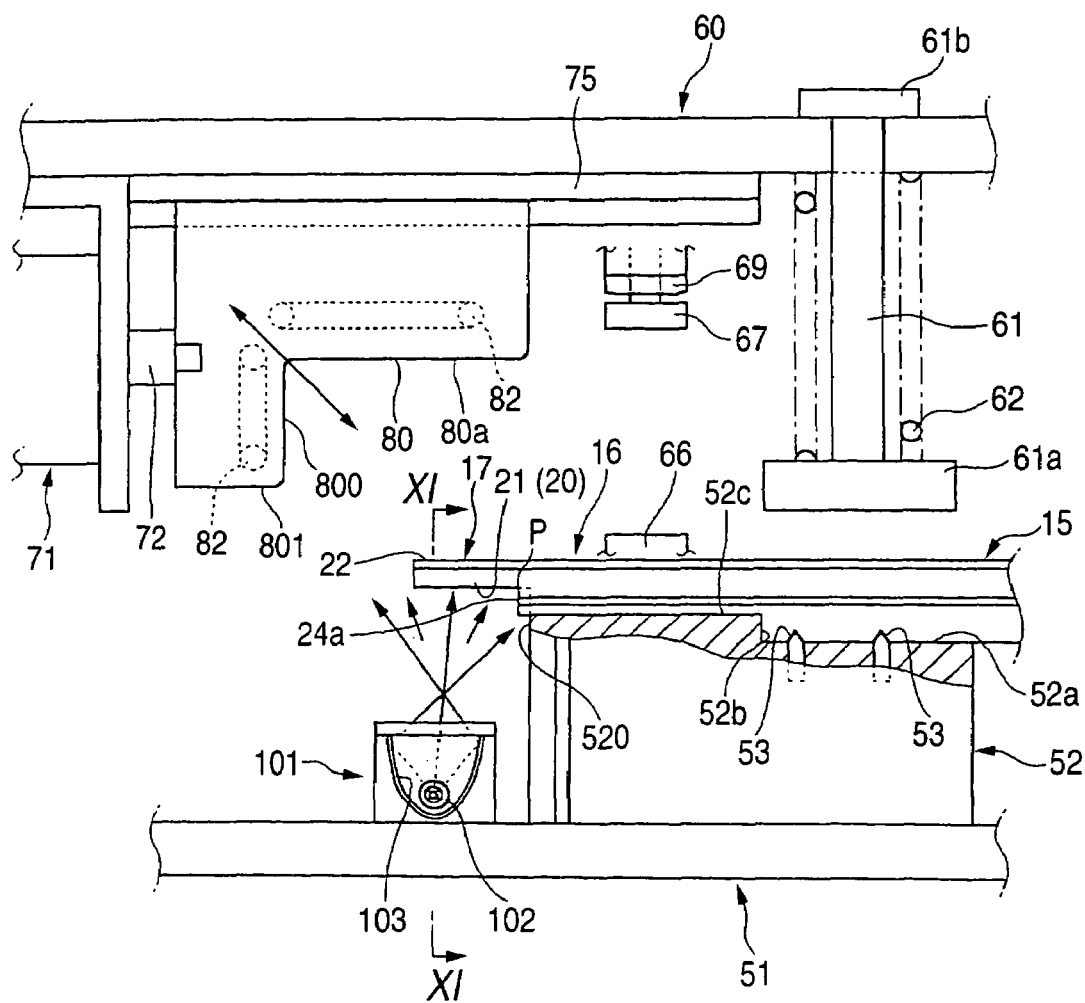
FIG. 10 is an explanatory view showing a state that the molding body is set to a fixed die.
Figure 11:
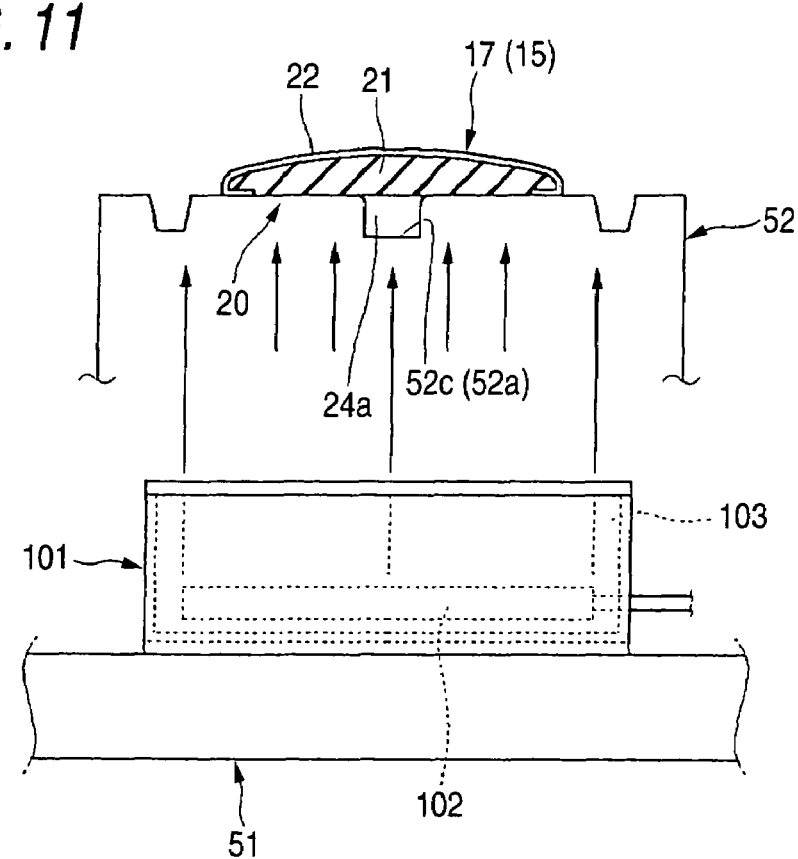
FIG. 11 is a cross sectional view showing a relationship between a near infrared heating device and the end portion of the molding body, taken along XI-XI line in FIG. 10.

In FIG. 9 and FIG. 10, a fixed die (lower mold) 52 in which the molding body 15 is positioned, fixed, and set is arranged at a predetermined position of an upper surface of a fixed table 51 (a die holder 51).

A first positioning groove 52a and a second positioning groove 52c, which is shallower than the first positioning groove 52a, are formed in parallel via a stepped portion 52b on the fixed die 52 in the longitudinal direction of the molding body 15. The supporting body 23 of the normal portion of the molding body 15 and the leg portion 24 of the end portion neighborhood 16 are fitted into this first positioning groove 52a from the upper side in parallel with the upper surface of the fixed die 52 to prevent a displacement of the molding body 15 in the axial direction. In this case, the stepped portion 52b is a contact portion used to decide a position of the molding body 15 in the longitudinal direction. A plurality of positioning and fixing pins 53 each having a pointed tip are provided on a bottom surface of the first positioning groove 52a to project therefrom. These positioning and fixing pins 53 prevent the displacement of the molding body 15 in the longitudinal direction to fix the molding body 15. Also, a forming surface 520 is formed on one side surface of the fixed die 52 at angle θ (e.g., 90 degree) with the first positioning groove 52a and the second positioning groove 52c. This forming surface 520 acts as a forming surface that is used to form the back surface side of the end portion 17 of the molding body 15 when a movable punch 80 is closed onto the fixed die 52.

As shown in FIG. 9, a movable plate 60 is arranged over the fixed table 51 via plural guide posts 55 and plural guide bushings 56 in such a manner that such movable plate 60 can be moved forward and backward (e.g., moved vertically) along the direction of the guide posts 55 to prevent a movement in the direction that intersects with the guide posts 55. This movable plate 60 is moved forward by a press ram 58 driven by a hydraulic cylinder, and is moved backward to a predetermined retreat end position by a spring force of a returning spring (not shown). In other words, if an axis directed along the longitudinal direction of the molding body 15 is set as a reference line, the movable plate 60 is arranged such that such movable plate 60 can be moved forward and backward in a predetermined direction (the perpendicular direction, e.g., the vertical direction) with respect to the reference line. In FIG. 9, a reference 57 is a returning spring of the guide post 55.

As shown in FIG. 9 and FIG. 10, the movable punch (upper mold) 80, which executes the mold closing and opening motion with respect to the fixed table 51 to form the end portion 17 of the molding body 15 by the press working, is arranged on one surface (lower surface) of the movable plate 60, which faces to the fixed table 51. This movable punch 80 includes a sandwiching surface 80a for cooperating with the fixed die 52 to sandwich the end portion neighborhood 16 of the molding body 15 between them when the movable punch 80 is closed onto the fixed die 52, a forming surface 800 for intersecting with the sandwiching surface 80a at an angle θ to form a curved surface on the surface side of the end portion 17, and a top end portion 801 positioned on the bottom side of a top end of the forming surface 800. Accordingly, a molding space (cavity) is formed by the forming surfaces 520, 800 between the fixed die 52 and the movable punch 80. These forming surfaces 520, 800 bend the end portion 17 of the molding body 15 at a predetermined bending angle θ (almost right angle in this embodiment 1) when the movable punch 80 is closed onto the fixed die 52.

As shown in FIG. 9 and FIG. 10, the movable punch 80 is moved while guided by a guiding mechanism, which is constructed by guide rails 75 provided on one side surface of the movable plate 60, in the direction that is perpendicular to the forward and backward moving directions of the movable plate 60, i.e., in the lateral direction that is perpendicular to the vertical direction.

Also, the movable punch 80 is moved forward and backward by a driving mechanism, which uses a motor, a fluid pressure cylinder, or the like as a driving source, in the direction that intersects with the forward and backward moving directions of the movable plate 60 at the time of the forward and backward motions of the movable plate 60 to execute the mold opening and closing motions with respect to the fixed die 52. In other words, the movable punch 80 is moved forward and backward in the oblique direction to the fixed die 52, which is the synthesized direction of the forward and backward moving directions of the movable plate 60 and the perpendicular direction to this direction, to execute the mold opening and closing motions. The movable punch 80 can come up to the fixed die 52 and go away from the fixed die 52 in any direction by controlling speeds of its forward and backward moving directions and the perpendicular direction to this direction.

In the embodiment 1, the driving mechanism of the movable punch 80 includes a motor (e.g., servo motor) 71 as a driving source, and a feed shaft 72 moved by converting a rotational motion of the motor 71 into a linear motion. Then, a top end portion of the feed shaft 72 is coupled to the movable punch 80.

Also, the motor 71 is operated and controlled by a control unit 90 in such a way the movable punch 80 is moved and controlled by desired forward and backward moving amounts in the direction, which intersects perpendicularly with the forward and backward moving directions of the movable plate 60, in response to a forward or backward moving amounts of the movable plate 60. In this case, it is preferable that, if a large mold closing force is required when the movable punch 80 is closed onto the fixed die 52, a feeding mechanism using a ball screw should be employed in place of the above mechanism as a mechanism to move the movable punch 80, for the movable punch 80 is never pushed back in the opposite direction to the moving direction at the time of closing the mold.

Also, a moving gauge axis 85 for measuring forward and/backward moving amounts of the movable plate 60 is provided to one member of the fixed table 51 and the movable plate 60, while a sensor 86 for sensing a position of the moving gauge axis 85 is provided to the other member. Then, a sensed signal of the sensor 86 is supplied to the control unit 90, and then the motor 71 is operated and controlled based on the sensed signal according to a previously set program. That is, a moving locus of the movable punch 80 is decided by the program.

In this case, a switching valve (solenoid valve) 87 provided to a hydraulic route, which is connected to the hydraulic cylinder to drive the press ram 58, is switched and controlled by the control unit 90 to lift up or bring down the press ram 58.

Also, refrigerant paths 82 through which the refrigerant is supplied to keep the movable punch 80 at a constant temperature are provided to an inside of the movable punch 80 (see FIG. 10). Also, similarly the refrigerant paths are provided to an inside of the fixed die 52, but their illustration will be omitted herein.

A pushing means (stripper) for pushing a portion of the molding body 15 except the end portion 17 to be bent at a predetermined position to prevent a displacement in the longitudinal direction is provided to a predetermined position of the movable plate 60.

As shown in FIG. 10, this pushing means is passed through the predetermined position of the movable plate 60 to move forward and backward. This pushing means is constructed to include an axial pushing body 61 having a pushing plate 61a at its one end (lower end) and a stopper plate 61b at its other end (upper end), and a pushing spring 62 made of a compression coil spring provided around the pushing body 61 between the pushing plate and the movable plate 60 to elastically push the pushing body 61.

Also, as shown in FIG. 10, a stopper means for stopping the movable plate 60 at a forward end position (bottom dead center) is provided between the fixed table 51 and the movable plate 60.

In this embodiment 1, the stopper means includes a fixed stopper 66 fixed on the fixed table 51 side and an adjusting stopper 67 screwed detachably to the movable plate 60 side and fixed by a fastening nut 69 so that the adjusting stopper 67 can be disposed at a desired position. Then, by allowing the adjusting stopper 67 to be disposed at an arbitrary position, the forward end position (bottom dead center) of the movable plate 60 is adjusted freely.

A heating device for heating and softening the end portion 17 of the molding body 15 that is set in the fixed die 52 is provided on the fixed table 51 next to one side of the fixed die 52. An infrared heating device is used as the heating device.

Also, the embodiment 1, a near infrared heating device 101 is used as the infrared heating device.

As shown in FIG. 9 and FIG. 10, the near infrared heating device 101 has a near infrared lamp (e.g., halogen lamp) 102, and a reflecting mirror 103 for converging the light emitted from the near infrared lamp 102 and reflecting the light to form a focal point. As a result, the light emitted from the near infrared lamp 102 can be irradiated only onto an area that is needed to heat the molding body 15, so that the heating of other portions can be prevented.

Also, the embodiment 1, a distance between the position of the end portion 17 of the molding body 15 that is set in the fixed die 52 and the near infrared lamp 102 in the near infrared heating device 101 is set such that the near infrared ray can be irradiated almost uniformly only to the to-be-heated area of the ornament body 21 of the molding main body 20 in the end portion 17 of the molding body 15 on the back surface side from the position that is far rather than a focal length of the reflecting mirror 103. Therefore, the energy that is required of the heating can be employed effectively, and the light is not irradiated to the normal portion of the molding body 15 and the movable punch 80 that are not needed to heat, and thus the undesirable temperature rise can be prevented.

Also, in the embodiment 1, when the near infrared ray is irradiated onto the back surface side of the ornament body 21 of the molding main body 20 in the end portion 17 of the molding body 15, the back surface of the ornament body 21 of the molding main body 20 is heated by the heat radiation while interrupting the irradiation of the near infrared ray with a lapse of time and changing an irradiation amount to increase or decrease alternately with a lapse of time, and the decorative layer 22 is heated almost uniformly by the thermal conduction.

Figure 12:
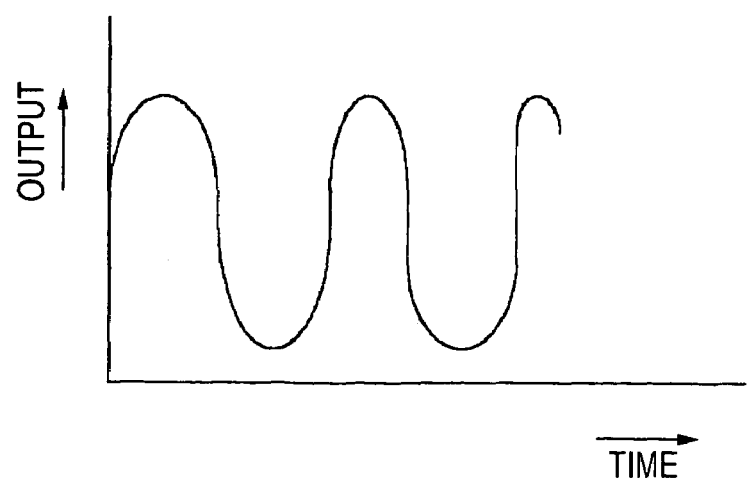
FIG. 12 is an explanatory view showing an embodiment in which an output of a near infrared lamp is controlled to form a wave shape with a lapse of time such that an irradiation amount of a near infrared ray emitted from the near infrared lamp of the near infrared heating device is changed to increase or decrease with a lapse of time.
Figure 13:
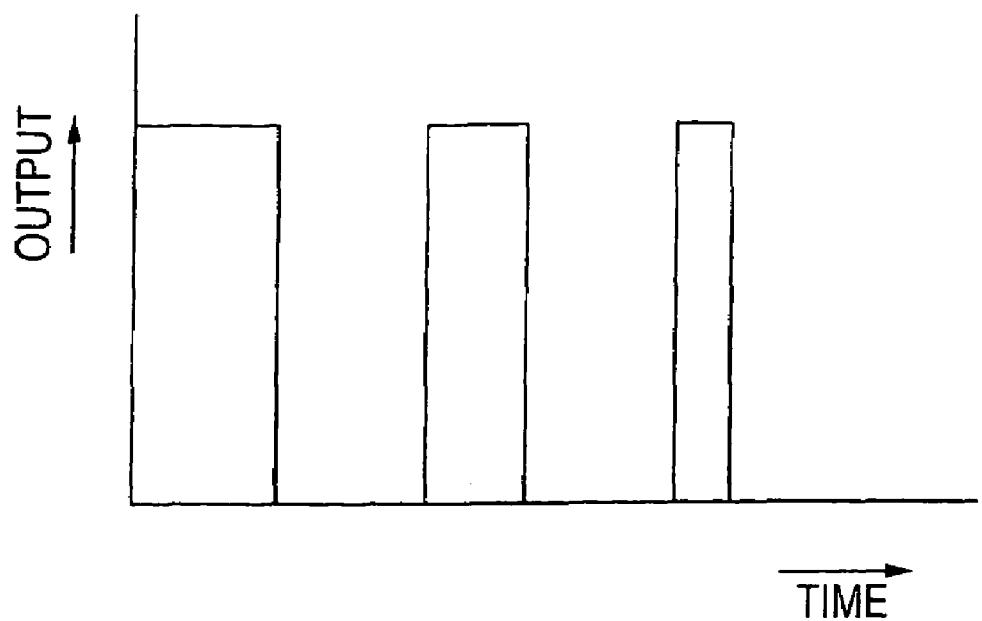
FIG. 13 is an explanatory view showing an embodiment in which a power supply of the near infrared lamp is ON/OFF-controlled with a lapse of time such that an irradiation amount of a near infrared ray emitted from the near infrared lamp of the near infrared heating device is changed to increase or decrease with a lapse of time.

For example, an irradiation amount of the near infrared ray can be changed to increase or decrease alternately with a lapse of time by controlling an output of the near infrared lamp 102 to form a wave shape with a lapse of time, as shown in FIG. 12, or by ON/OFF-controlling a power supply of the near infrared lamp 102 with a lapse of time, as shown in FIG. 13.

Next, a molding manufacturing method as well as an operation of the above molding manufacturing system will be explained with reference to FIG. 10 to FIG. 15 hereinafter.

First, as shown in FIG. 5, the long molding body 15 is prepared.

Then, in the state that, as shown in FIG. 10, the movable plate 60 is arranged at the retreat position and the movable punch 80 is opened, the supporting body 23 of the normal portion of the molding body 15 and an upper half portion of the leg portion 24 of the end portion neighborhood 16 are fitted into the first positioning groove 52a and the second positioning groove 52c of the fixed die 52 respectively, while bringing a stepped portion 25a located at the boundary portion between the normal portion of the molding body 15 and the end portion neighborhood 16 into contact with the stepped portion 52b between the first positioning groove 52a and the second positioning groove 52c of the fixed die 52 to position the molding body 15 in the longitudinal direction. At this time, the molding body is temporarily fixed and set by a plurality of positioning and fixing pins 53 that are provided on the bottom surface of the first positioning groove 52a.

As described above, when the molding body 15 is set, the end portion 17 of the molding body 15 is set to protrude from one side of the fixed die 52, whereas an end surface of the leg portion 24 acting as a stepped portion 24a at the boundary portion between the end portion 17 and the end portion neighborhood 16 is projected slightly from one side of the fixed die 52. Then, the stepped portion 24a, i.e., the end surface of the leg portion 24 is welded to the back surface of the end portion 17.

Then, the near infrared lamp 102 of the near infrared heating device 101 is turned on (ON). Then, the near infrared ray emitted from the near infrared lamp 102 is irradiated onto the back surface side of the ornament body 21 of the molding main body 20 in the end portion 17 of the molding body 15 (see arrows indicated in FIG. 10 and FIG. 11). Then, it is preferable that the near infrared ray should be irradiated to have an irradiation width that almost coincides with a width of the end portion 17 or that is wider than the width of the end portion 17.

As a result, the end portion 17 of the molding body 15 is heated and softened to keep the condition that the decorative layer 22 has a softened level lower than the ornament body 21 of the molding main body 20 in the end portion 17 of the molding body 15.

Also, it is desired that, when the near infrared ray is irradiated, an irradiation amount of the near infrared ray should be changed to increase and decrease alternately with a lapse of time by controlling the output of the near infrared lamp 102 to form a wave shape with a lapse of time, as shown in FIG. 12, or ON/OFF-controlling the power supply of the near infrared lamp 102 with a lapse of time, as shown in FIG. 13.

In this case, the ornament body 21 of the molding main body 20 is softened almost uniformly by the heat radiation and the thermal conduction from its back surface to the decorative layer 22 on the surface side in the end portion 17 of the molding body 15. At this time, because of the above characteristics of the material, the decorative layer 22 is kept in the softened level lower than the ornament body 21 even when such decorative layer 22 is heated up to the same temperature as the ornament body 21.

Then, the movable plate 60 is moved forward to a forward (lower, in this case) end position by the press ram 58 during when the end portion 17 of the molding body 15 is still kept in the softened state after the irradiation of the near infrared ray is stopped.

First, the movable plate 60 is moved forward to a predetermined position, and also the pushing plate 61a of the pushing body 61 comes at first into contact with the decorative layer 22 of the molding body 15. The pushing spring 62 is compressed elastically by the subsequent forward moving motion of the movable plate 60, and then the molding body 15 is pushed against the fixed die 52 by a spring force of the pushing spring 62 via the pushing body 61. As a result, the positioning and fixing pins 53 encroach upon the bottom surface of the supporting body 23 of the molding body 15, so that the molding body 15 can be firmly fixed to the fixed die 52 not to displace in the longitudinal direction. At this point of time, the movable punch 80 is moved to the position at which the underlying top end portion 801 is overlapped with the overlying end portion 17 to hold a clearance between them.

Then, the movable plate 60 is moved further forward and also the motor 71 is operated. Then, the movable punch 80 is moved forward by the feed shaft 72 in the direction that is perpendicular to the forward moving direction of the movable plate 60, i.e., the lateral direction that is perpendicular to the vertical direction in the embodiment 1.

As a result, the movable punch 80 is moved forward in the oblique direction, which is the synthesized direction of the forward moving direction of the movable plate 60 and the direction perpendicular to such direction, to execute the mold closing motion with respect to the fixed die 52.

Figure 14:
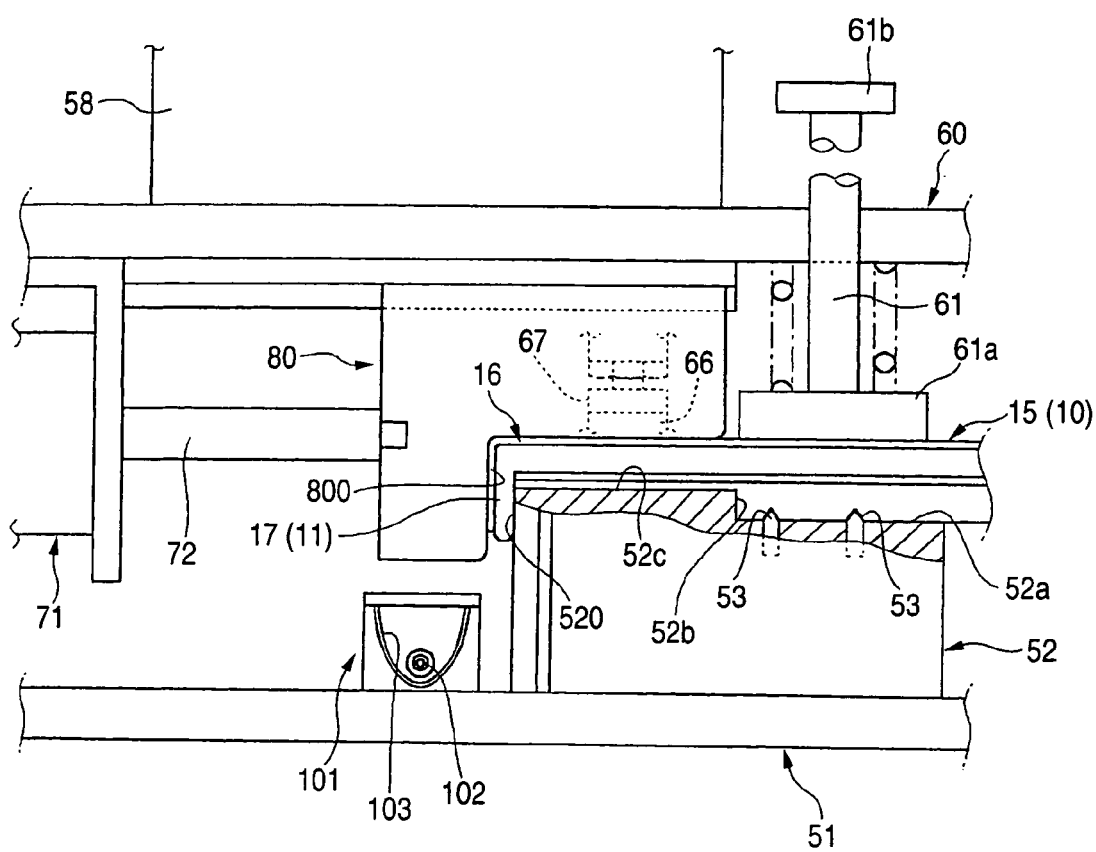
FIG. 14 is an explanatory view showing a state that the end portion of the molding body is subjected to a press working by closing a fixed die with a movable punch.

As shown in FIG. 14, the movable plate 60 is moved toward the forward end position at which the moving-late side stopper 67 comes into contact with the fixed stopper 66, and also the movable punch 80 is moved forward to the forward end position in the oblique direction, i.e., the mold closing position. At that time, the bottom-side top end portion 801 of the movable punch 80 is brought into contact with the top end surface of the end portion 17 at a position that is set apart from a bending center position P of the end portion 17 of the molding body 15 to the top end side by a predetermined distance, and thus a pushing force of the movable punch 80 is applied to the end portion 17. Thus, such end portion 17 is bent downward. Subsequently, the movable punch 80 is moved forward to the mold closing position. Thus, the end portion 17 of the molding body 15 is bent up to a predetermined bending angle θ (almost right angle) by the press working (bending) and also is slightly compressed between the forming surface 520 of the fixed die 52 and the forming surface 800 of the movable punch 80. Then, the end cover portion 11 having the predetermined shape is formed by the end portion 17 that is bent by an almost right angle, whereby the molding 10 having the end cover portion 11 is manufactured. In this case, since the back surface of the end portion 17 and the stepped portion 24a (end surface of the leg portion 24) at the boundary portion between the end portion 17 and the end portion neighborhood 16 are welded mutually, the event that the end cover portion 11 tends to return to its original shape can be further prevented. Also, a moving locus of the movable punch 80 is decided previously by the program such that the movable punch 80 is moved on a line with an angle ½·θ from the position immediately before the mold closing position to the mold closing position.

As described above, after the movable punch 80 is closed and the formed end cover portion 11 is cooled and solidified, the movable plate 60 and the movable punch 80 are moved backward to their original retreat end positions.

Then, the molding 10 having the end cover portion 11 is released from the fixed die 52.

Figure 15:
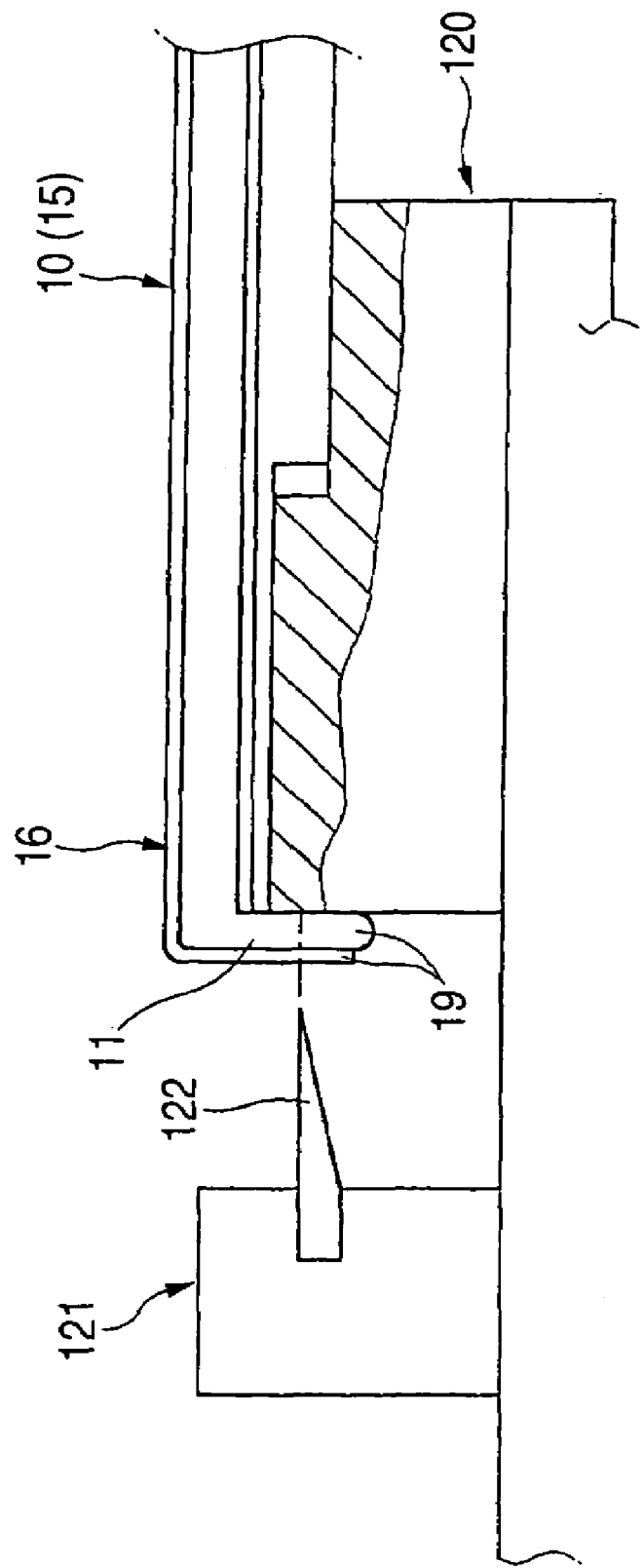
FIG. 15 is an explanatory view showing a trimming cutting device for the end cover portion of the molding.

Also, if there is a necessity that the trimming must be applied to the end cover portion 11 of the molding 10 manufactured as above, such trimming is carried out by another step. In other words, as shown in FIG. 15, the molding 10 is set in a trimming fixed die 120 and then a moving cutting tool 121 for trimming is moved forward to the trimming fixed die 120. Thus, an extra portion 19 of the end cover portion 11 of the molding 10 is cut and removed by a cutting edge 122 of the moving cutting tool 121, and thus the trimming is carried out.

As described above, according to the molding manufacturing method in the embodiment 1, since the near infrared ray is irradiated onto the back surface side of the molding main body 20 (ornament body 21) that corresponds to the end portion 17 of the molding body 15, the end portion 17 can be heated and softened satisfactorily while keeping the temperature of the decorative layer 22 side lower than the temperature of the back surface side and also maintaining the state that a softened level of the decorative layer 22 on the surface of the ornament body 21 is still lower than the molding main body 20 (ornament body 21). In addition, it can be prevented that the normal portions except the end portion 17 of the molding body 15 are heated and softened and thermally deformed unexpectedly. Therefore, the end portion 17 and the decorative layer 22 of the end portion neighborhood 16 are not excessively heated, damages caused by the movable punch can be prevented, and the pleasant decorative layer 22 can be still maintained.

Also, because the near infrared heating is employed, the heating of the end portion 17 of the molding body 15 can be easily controlled by the electrical control. In addition, the partial areas that need the heating can be heated precisely in proper quantities.

As a result, the end cover portion 11 having the pleasing appearance can be formed by bending the end portion 17 of the molding body 15 satisfactorily by virtue of the press working using the fixed die 52 and the movable punch 80. In addition, occurrence of uneven distortion, etc. on the surface of the decorative layer 22 near the end portion 17 and the end portion neighborhood 16, i.e., the end cover portion 11 can be prevented.

Also, according to the molding manufacturing method of the embodiment 1, the near infrared ray is irradiated onto the back surface side of the molding main body 20 (ornament body 21) in the end portion 17 of the molding body 15 while changing an irradiation amount of the near infrared ray to increase and decrease alternately with a lapse of time. Therefore, the back surface side of the end portion 17 of the molding body 15 is heated by the heat radiation and the decorative layer 22 side on the surface side is heated by the thermal conduction from the back surface side. At this time, since the back surface side is never heated excessively, such disadvantages can be prevented that the back surface of the end portion 17 of the molding body 15 is heated excessively and melt away, a burn occurs, etc.

Accordingly, the press working (bending) can be applied to the end portion 17 of the molding body 15 more satisfactorily, and also the end cover portion 11 can be shaped satisfactorily into the desired shape.

Further, the molding main body 20 (ornament body 21) in the end portion 17 of the molding body 15 can be heated and softened quickly by a penetrating energy, which is one characteristic of the near infrared ray, from the back surface to the inner side. As a result, improvement in the productivity of the molding 10 can be achieved by shortening a heating and softening time of the end portion 17 of the molding body 15.

Also, the near infrared heating device 101 includes the near infrared lamp 102, and the reflecting mirror 103 for reflecting the light emitted from the near infrared lamp 102 to form a focal point in the forward area. A distance between the position of the end portion 17 of the molding body 15, which is set in the fixed die 52, and the near infrared lamp 102 of the near infrared heating device 101 is set such that the near infrared ray is irradiated almost uniformly onto the back surface side area of the molding main body 20 (ornament body 21) in the end portion 17 of the molding body 15 at a position that is remote rather than a focal length of the reflecting mirror 103.

For this reason, the molding main body 20 (ornament body 21) can be heated and softened substantially uniformly over the almost full length of the end portion 17 of the molding body 15. Therefore, the disadvantage caused by a nonuniformity of the softened level, e.g., the bending failure of the end portion 17 of the molding body 15 can be prevented. Also, the energy required of the heating can be used effectively.

Embodiment 2

Next, an embodiment 2 of the present invention will be explained with reference to FIG. 16 hereinafter.

Figure 16:
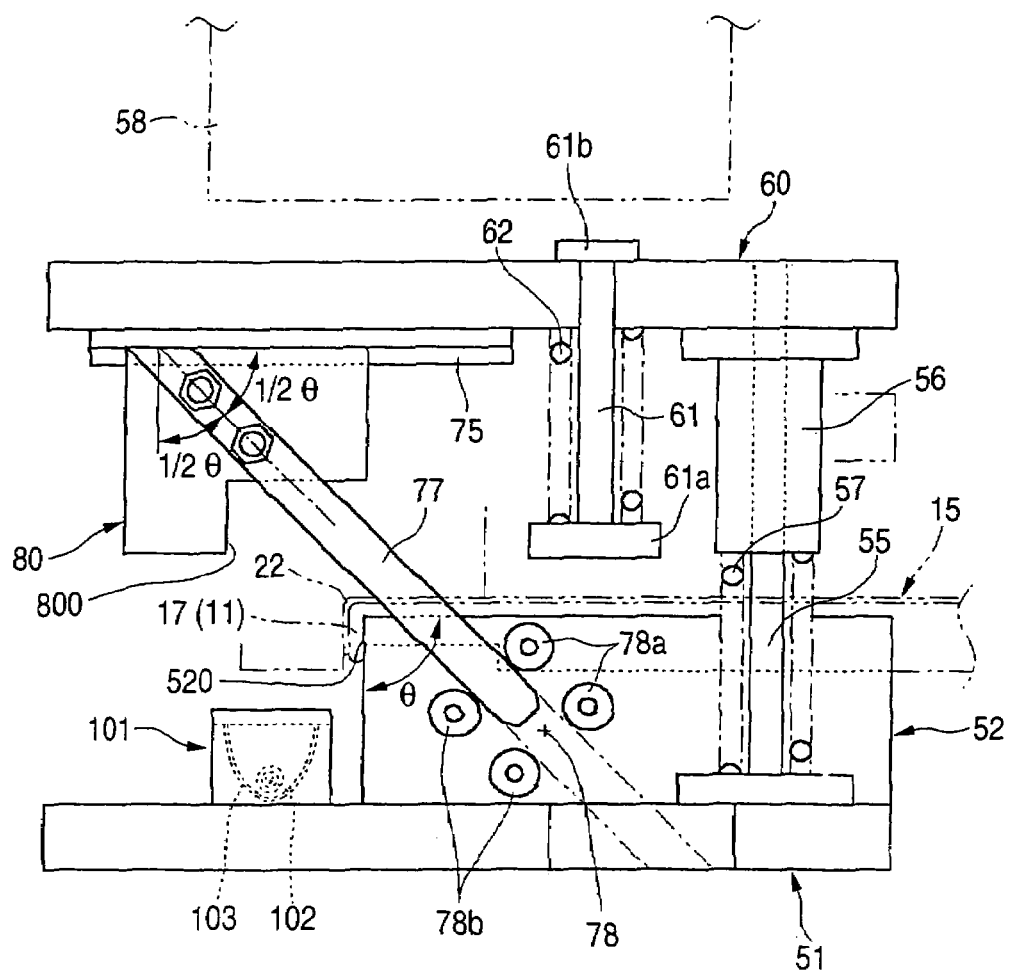
FIG. 16 is an explanatory view showing an embodiment 2 of the present invention wherein a movable punch driving mechanism is constructed by a cam mechanism having a cam follower and a cam groove.

As shown in FIG. 16, the driving mechanism of the movable punch 80, which is moved while guided by the guiding mechanism using the guiding rails 75 provided to one side surface of the movable plate 60 in the direction that is perpendicular to the forward and backward moving directions of the movable plate 60 (e.g., lateral direction perpendicular to the vertical direction), is exchanged for a cam mechanism that is different from the embodiment 1.

More particularly, in an embodiment 2 of the present invention, a rod-like cam follower 77 is fixed to the side surface of the movable punch 80 in the oblique state whose angle is set to an angle ½·θ, where θ is a bending angle. In contrast, a plurality of rollers 78a, 78b are fitted to the side surface of the fixed die 52 to correspond to the cam follower 77. A cam groove 78 for guiding the cam follower 77 between these plural rollers 78a, 78b is formed. Then, the cam mechanism consists of the cam follower 77 and the cam groove 78.

Since other configurations of the embodiment 2 are constructed similarly to the embodiment 1, their explanation will be omitted herein by affixing the same reference symbols to the same constituent portions.

Therefore, in the embodiment 2, the end portion 17 of the molding body 15 is heated and softened by the near infrared heating device 101 to maintain still the condition that the decorative layer 22 of the end portion 17 of the molding body 15 has the softened level lower than the ornament body 21 of the molding main body 20.

Then, when the movable plate 60 is moved forward to the forward end position by the press ram 58, the movable punch 80 is also moved forward by a cam action executed by the cam follower 77 and the cam groove 78 in the oblique direction, which is the synthesized direction of the forward moving direction of the movable plate 60 and the direction perpendicular to such direction, to carry out the mold closing motion with respect to the fixed die 52.

Accordingly, the end portion 17 of the molding body 15 is bent by the press working (bending) up to a predetermined bending angle θ (almost right angle). Then, the molding 10 having the end cover portion 11, which consists of the end portion 17 that was bent by an almost right angle, is manufactured.

As described above, since the driving mechanism of the movable punch 80 is constructed by the cam mechanism consisting of the cam follower 77 and the cam groove 78, it is possible to cause the movable punch 80 to execute the precise repeating operation and also it is possible to simplify the structure of the molding manufacturing system. In this case, it is preferable that the setting angle of the cam follower 77 should be set to ½·θ (e.g., 45 degree). But such setting angle of the cam follower 77 may be adjusted and set freely by changing appropriately a fitting position (fitting angle) of the cam follower 77 with respect to the movable punch 80.

Also, the cam follower 77 and the cam groove 78 may be provided in the opposite manner to the above embodiment 2, i.e., the cam follower 77 may be provided to the fixed die 52 and the cam groove 78 may be provided to the movable punch 80.

In this case, it is similar to the embodiment 1 that the moving locus of the movable punch 80 is decided such that the movable punch 80 is moved along the line with an angle ½·θ from the position immediately before the mold closing position to the mold closing position.

Embodiment 3

Next, an embodiment 3 of the present invention will be explained with reference to FIG. 17 and FIG. 18 hereinafter.

Figure 17:
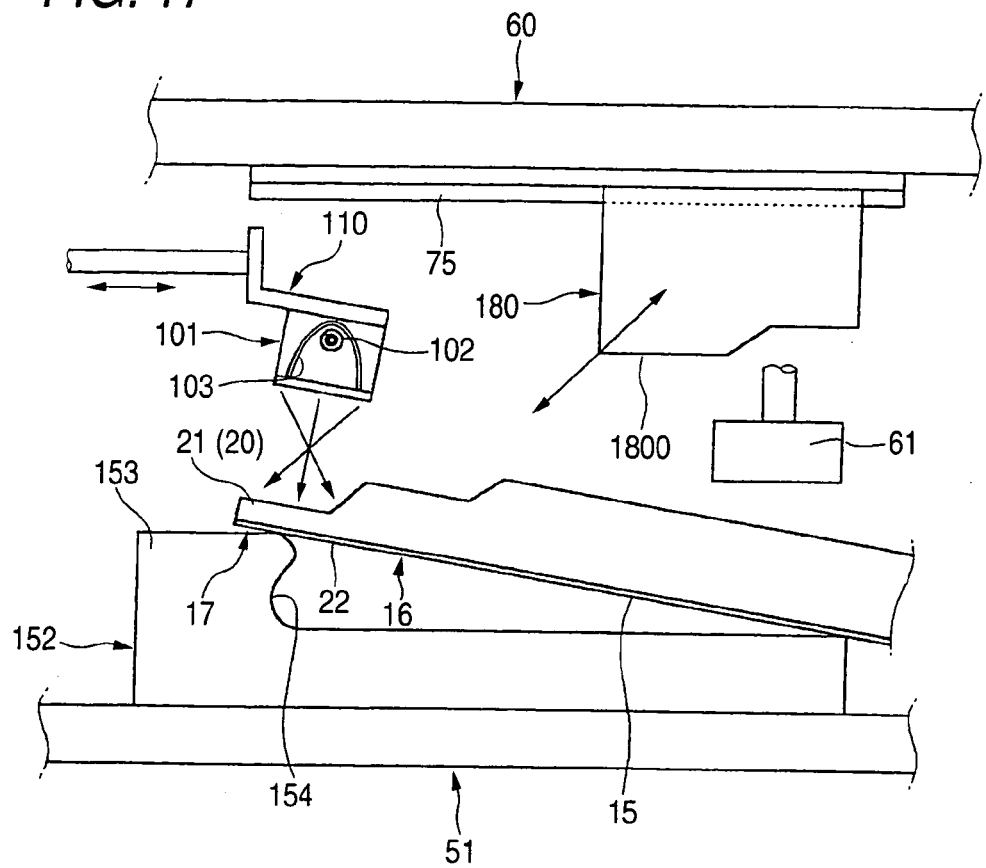
FIG. 17 is an explanatory view showing an embodiment 3 of the present invention wherein the molding body is set onto the fixed die in a state that the movable punch is opened with respect to the fixed die.

FIG. 17 is an explanatory view showing a state that the molding body 15 is set on the fixed die in the condition that the movable punch, which is used to form the back surface side of the molding body, is opened from the fixed die, which is used to form the surface side of the molding body. FIG. 18 is an explanatory view showing a state that the end portion of the molding body is subjected to the press working (bending) by closing the movable punch onto the fixed die.

In FIG. 17, a convex portion 153 is formed on one side on a fixed die 152 that is arranged on the fixed table 51, and a concavely-curved forming surface 154 corresponding to the bending shape of the end portion 17 of the molding body 15 is formed on a side surface of the convex portion 153. Then, the molding body 15 is positioned and set on the fixed die 152 in such a manner that the back surface side of the molding body 15 is directed to a movable punch 180 (upwardly) and that the surface of the end portion 17 of the molding body 15 is put on a corner portion of the convex portion 153 to set its longitudinal direction obliquely.

The movable punch (upper mold) 180 is arranged on one side surface (lower surface) of the movable plate 60, which opposes to the fixed table 51. This movable punch 180 executes the mold closing and opening motions with respect to the fixed die 15, and applies the press working (bending) to push the end portion 17 of the molding body 15 into the concavely-curved forming surface 154 of the fixed die 152.

This movable punch 180 is moved and guided by the guiding mechanism consisting of the guiding rails 75, which are provided to one side surface of the movable plate 60, in the direction that is perpendicular to the forward and backward moving directions of the movable plate 60, e.g., the lateral direction that is perpendicular to the vertical direction.

Also, when the movable plate 60 is moved forward and backward, the movable punch 180 is also moved forward and backward by the driving mechanism using the motor, the fluid pressure cylinder, or the like as the driving source, like the embodiment 1, or the driving mechanism consisting of the cam mechanism using the cam follower and the cam groove, like the embodiment 2, in the direction, which is perpendicular to the forward and backward moving directions of the movable plate 60, to carry out the mold closing and opening motions with respect to the fixed die 152. But their illustration is omitted herein. In other words, the movable punch 180 is moved forward to or backward from the fixed die 152 in the oblique direction, which is the synthesized direction of the forward and backward moving directions of the movable plate 60 and the direction perpendicular to such directions, to carry out the mold closing and opening motions.

Also, as shown in FIG. 17, the near infrared heating device 101 for heating and softening the end portion 17 of the molding body 15 by irradiating the near infrared ray onto it from its back surface side is fitted to a movable bracket 110 between the fixed table 51 and the movable plate 60 such that such heating device 101 can be moved to a heating position, at which the heating device 101 heats the end portion 17 of the molding body 15, and a retreat position, at which the heating device 101 is retreated from an area between the fixed table 51 and the movable plate 60.

Also, like the embodiment 1, the near infrared heating device 101 of the embodiment 3 includes the near infrared lamp (e.g., halogen lamp) 102 and the reflecting mirror 103 for reflecting the light emitted from the near infrared lamp 102 to form the focal point. Then, as shown in FIG. 17, a distance between the position of the end portion 17 of the molding body 15, which is set in the fixed die 152, and the near infrared lamp 102 in the near infrared heating device 101 is set such that, when the near infrared heating device 101 is brought into the heating position, the near infrared ray can be irradiated almost uniformly only onto the back surface side area of the ornament body 21 of the molding main body 20 in the end portion 17 of the molding body 15 from the position that is separated farther than the focal length of the reflecting mirror 103. In this case, the pushing body 61 for pushing the normal portion of the molding body 15 by a spring force of the pushing spring when the press working is applied to the end portion 17 of the molding body 15 is arranged in a predetermined position of the movable plate 60.

In the embodiment 3 constructed as above, as shown in FIG. 7, the end portion 17 of the molding body 15 is heated and softened by the near infrared heating device 101, which is arranged at the heating position, while maintaining the condition that the decorative layer 22 of the end portion 17 of the molding body 15 has the softened level lower than the ornament body 21 of the molding main body 20.

Figure 18:
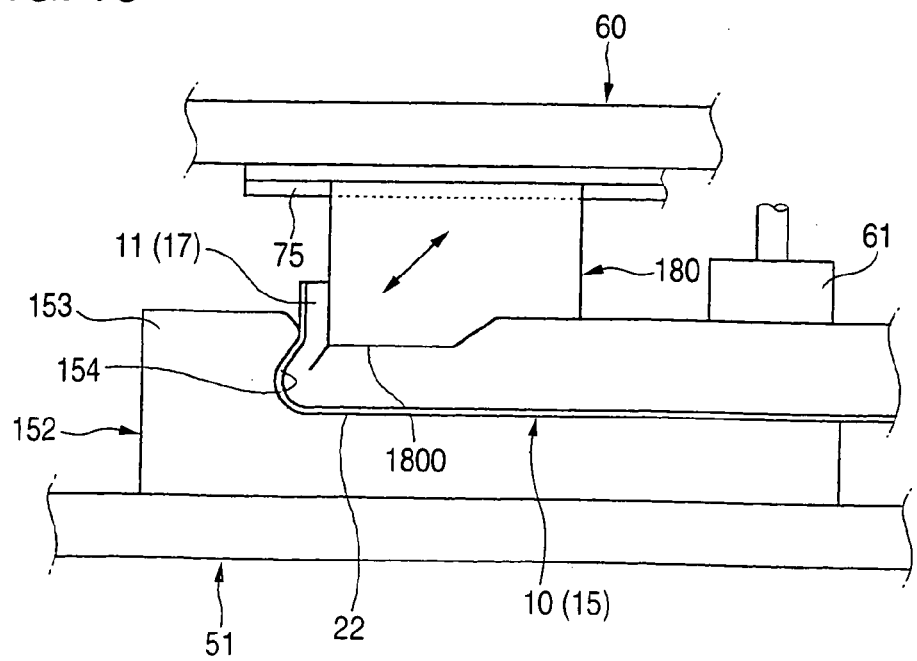
FIG. 18 is an explanatory view showing a state that the end portion of the molding body is subjected to the press working (bending) by closing the fixed die with the movable punch.

Then, as shown in FIG. 18, when the movable plate 60 is moved forward to the forward end position, the movable punch 180 is also moved forward by the driving mechanism in the oblique direction, which is the synthesized direction of the forward moving direction of the movable plate 60 and the direction perpendicular to such direction, to carry out the mold closing motion with respect to the fixed die 152.

Accordingly, the end portion 17 of the molding body 15 is pushed into the concavely-curved forming surface of the fixed die 52 and is subjected to the press working (bending). Then, the end cover portion 11 having a predetermined shape is formed of the end portion 17 that is concavely bent. Thus, the molding 10 having such end cover portion 11 is manufactured.

Embodiment 4

Figure 19:
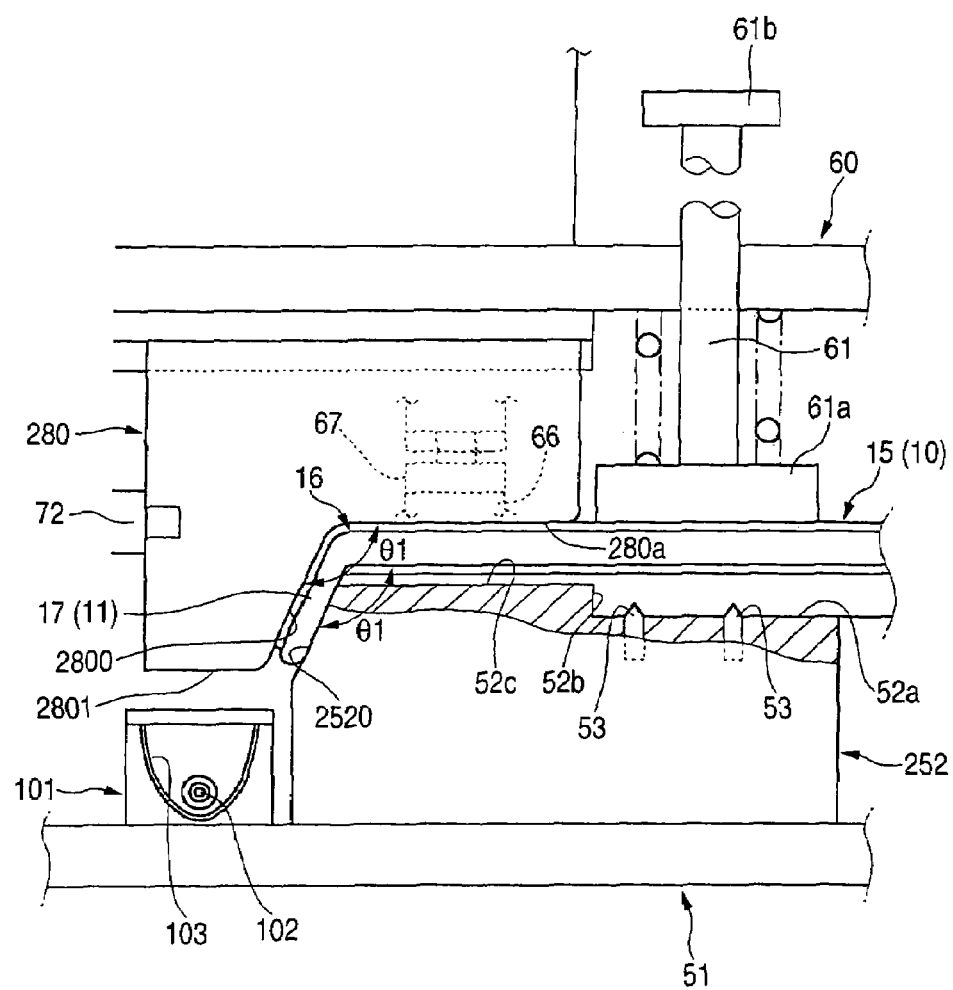
FIG. 19 is an explanatory view showing an embodiment 4 of the present invention wherein the end portion of the molding body is subjected to the press working (bending) by closing the fixed die with the movable punch.

Next, an embodiment 4 of the present invention will be explained with reference to FIG. 19 hereunder.

In this embodiment 4, out of a fixed die 252 and a movable punch 280, a forming surface 2520 is formed on one side surface of the fixed die 252 at a predetermined obtuse angle $\theta 1$ of 90 degree or more with the first positioning groove 52a and the second positioning groove 52c. This forming surface 2520 acts as a forming surface to form the back surface side of the end portion 17 of the molding body 15 when the movable punch 280 is closed onto the fixed die 252.

Also, the movable punch 280 includes a sandwiching surface 280a for sandwiching the end portion neighborhood 16 of the molding body 15 to cooperate with the fixed die 252 when the movable punch 280 is closed onto the fixed die 252, a forming surface 2800 for intersect with the sandwiching surface 280a at an obtuse angle $\theta 1$ to form a bent surface of the end portion 17 on the surface side, and a top end portion 2801 provided to a bottom-side top end of the forming surface 2800. Therefore, a molding space (cavity) is formed by the forming surfaces 2520, 2800, which bend the end portion 17 of the molding body 15 by the obtuse angle $\theta 1$ when the movable punch 280 is closed onto the fixed die 252, between the fixed die 252 and the movable punch 280.

Since other structures of this embodiment 4 are constructed similarly to the above embodiment 1 or 2, their explanation will be omitted herein by affixing the same reference symbols to the same constituent portions.

As a result, according to the molding manufacturing system of the embodiment 4, the end portion 17 of the molding body 15 can be press-worked by mutual forming surfaces 2520, 2800 of the fixed die 252 and the movable punch 280 to have the predetermined obtuse angle $\theta 1$, and also the molding 10 with the end cover portion 11 having the predetermined obtuse angle $\theta 1$ can be easily manufactured.

Embodiment 5

Figure 20:
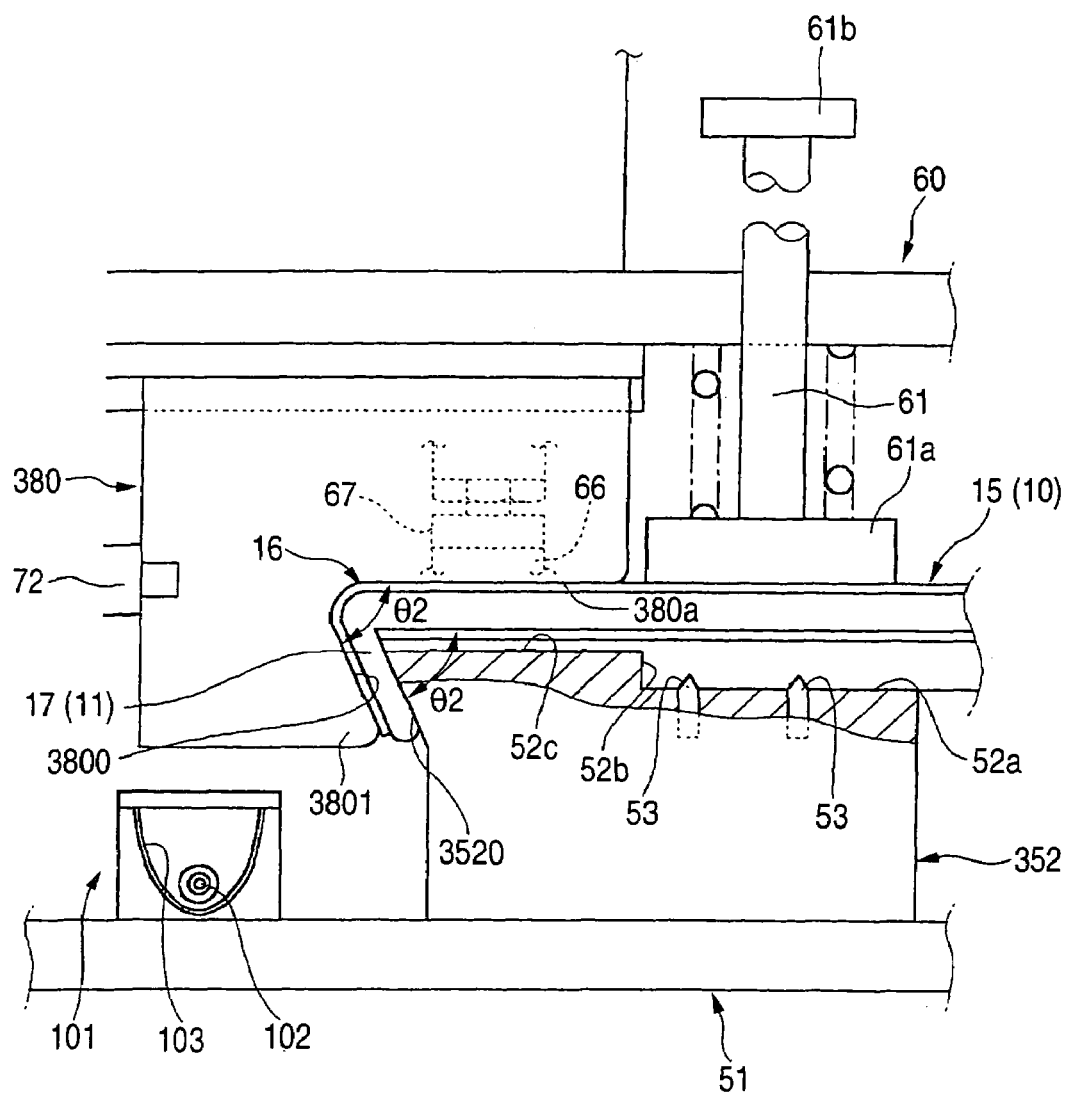
FIG. 20 is an explanatory view showing an embodiment 5 of the present invention wherein the end portion of the molding body is subjected to the press working (bending) by closing the fixed die with the movable punch.

Next, an embodiment 5 of the present invention will be explained with reference to FIG. 20 hereunder.

In this embodiment 5, out of a fixed die 352 and a movable punch 380, a forming surface 3520 is formed on one side surface of the fixed die 352 at a predetermined obtuse angle $\theta 2$ of 90 degree or less with the first positioning groove 52a and the second positioning groove 52c. This forming surface 3520 acts as a forming surface to form the back surface side of the end portion 17 of the molding body 15 when the movable punch 380 is closed onto the fixed die 352.

Also, the movable punch 380 includes a sandwiching surface 380a for sandwiching the end portion neighborhood 16 of the molding body 15 to cooperate with the fixed die 352 when the movable punch 380 is closed onto the fixed die 352, a forming surface 3800 for intersect with the sandwiching surface 380a at an obtuse angle $\theta 2$ to form a bent surface of the end portion 17 on the surface side, and a top end portion 3801 provided to a bottom-side top end of the forming surface 3800. Therefore, a molding space (cavity) is formed by the forming surfaces 3520, 3800, which bend the end portion 17 of the molding body 15 by the obtuse angle $\theta 2$ when the movable punch 380 is closed onto the fixed die 352, between the fixed die 352 and the movable punch 380.

Since other structures of this embodiment 5 are constructed similarly to the above embodiment 1 or 2, their explanation will be omitted herein by affixing the same reference symbols to the same constituent portions.

As a result, according to the molding manufacturing system of the embodiment 5, the end portion 17 of the molding body 15 can be press-worked by mutual forming surfaces 3520, 3800 of the fixed die 352 and the movable punch 380 to have the predetermined obtuse angle $\theta 2$, and also the molding 10 with the end cover portion 11 having the predetermined obtuse angle $\theta 2$ can be easily manufactured.

Embodiment 6

Hereinbelow, an embodiment 6 of the invention will be explained with reference to drawings. Since structural configurations of the embodiment 6 with regard to a molding are broadly the same as those of the embodiment 1, here, configurations different from Embodiment 1 will primarily be explained.

In the embodiment 6, a length L1 of the linear end portion 17 of the longitudinally-extending molding body 15 is set longer than a length L2 of the end cover portion 11 of the finally-formed molding 10 by a predetermined length and is set shorter than a length L3 of a forming surface 1800' of the first movable punch 180' described later (see FIG. 4, FIG. 5 and FIG. 23).

A molding manufacturing system (also referred to as a molding mold equipment) according to Embodiment 6 will be explained below referring to FIG. 21 and FIG. 22.

Figure 21:
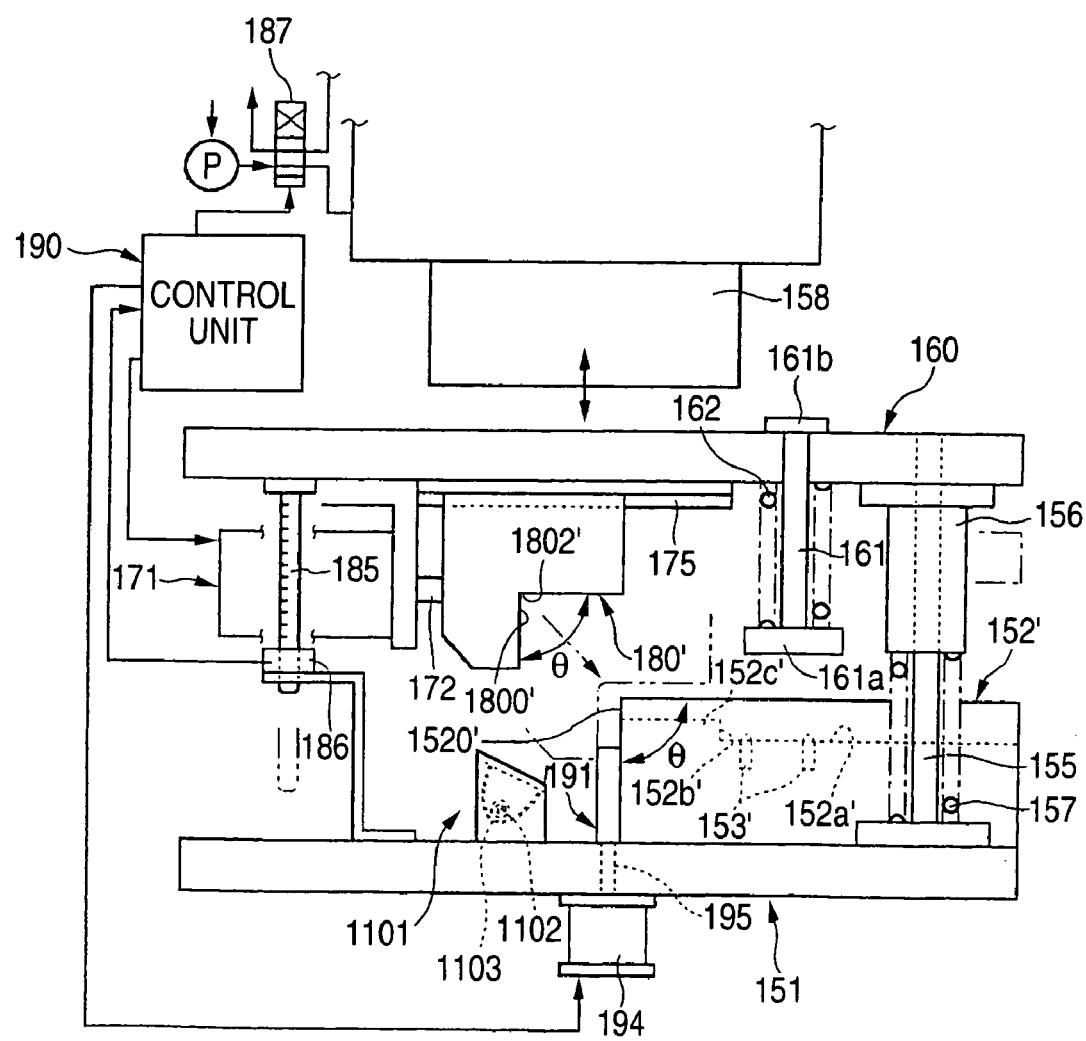
FIG. 21 is an explanatory view showing an overall configuration of the molding manufacturing system according to an embodiment 6 of the invention in a simplified fashion.

FIG. 21 is an explanatory view showing an overall configuration of the molding manufacturing system in a simplified fashion. FIG. 22 is an explanatory view showing a state that the molding body is set in the fixed die.

In this embodiment 6, the molding manufacturing system is constructed to include a fixed die 152', a first movable punch 180', a second movable punch 191, and a near infrared heating device 1101 as the heating device. In other words, as shown in FIG. 21 and FIG. 22, a fixed die (lower mold) 152' in which the molding body 15 is positioned, fixed, and set is arranged at a predetermined position of an upper surface of a fixed table 151.

A first positioning groove 152a' and a second positioning groove 152c', which is shallower than the first positioning groove 152a', are formed in parallel via a stepped portion 152b' on the fixed die 152' in the longitudinal direction of the molding body 15. The supporting body 23 of the normal portion of the molding body 15 and the leg portion 24 of the end portion neighborhood 16 are fitted into this first positioning groove 152a' from the upper side in parallel with the upper surface of the fixed die 152' to prevent a displacement of the molding body 15 in the axial direction. In this case, the stepped portion 152b' is a contact portion used to decide a position of the molding body 15 in the longitudinal direction. A plurality of positioning and fixing pins 153' each having a pointed tip are provided on a bottom surface of the first positioning groove 152a' to project therefrom. These positioning and fixing pins 153' prevent the displacement of the molding body 15 in the longitudinal direction to fix the molding body 15. Also, a forming surface 1520' is formed on one side surface of the fixed die 152' at angle θ (e.g., 90 degree) with the first positioning groove 152a' and the second positioning groove 152c'. This forming surface 1520' acts as a forming surface that is used to form the back surface side of the end portion 17 of the molding body 15 when a movable punch 180' is closed onto the fixed die 152'.

As shown in FIG. 21, a movable plate 160 is arranged over the fixed table 151 via plural guide posts 155 and plural guide bushings 156 in such a manner that such movable plate 160 can be moved forward and backward (e.g., moved vertically) along the direction of the guide posts 155 to prevent a movement in the direction that intersects with the guide posts 155. This movable plate 160 is moved forward by a press ram 158 driven by a hydraulic cylinder, and is moved backward to a predetermined retreat end position by a spring force of a returning spring (not shown). In other words, if an axis directed along the longitudinal direction of the molding body 15 is set as a reference line, the movable plate 160 is arranged such that such movable plate 160 can be moved forward and backward in a predetermined direction (the perpendicular direction, e.g., the vertical direction) with respect to the reference line. In FIG. 21, a reference 157 is a returning spring of the guide post 155.

Figure 22:
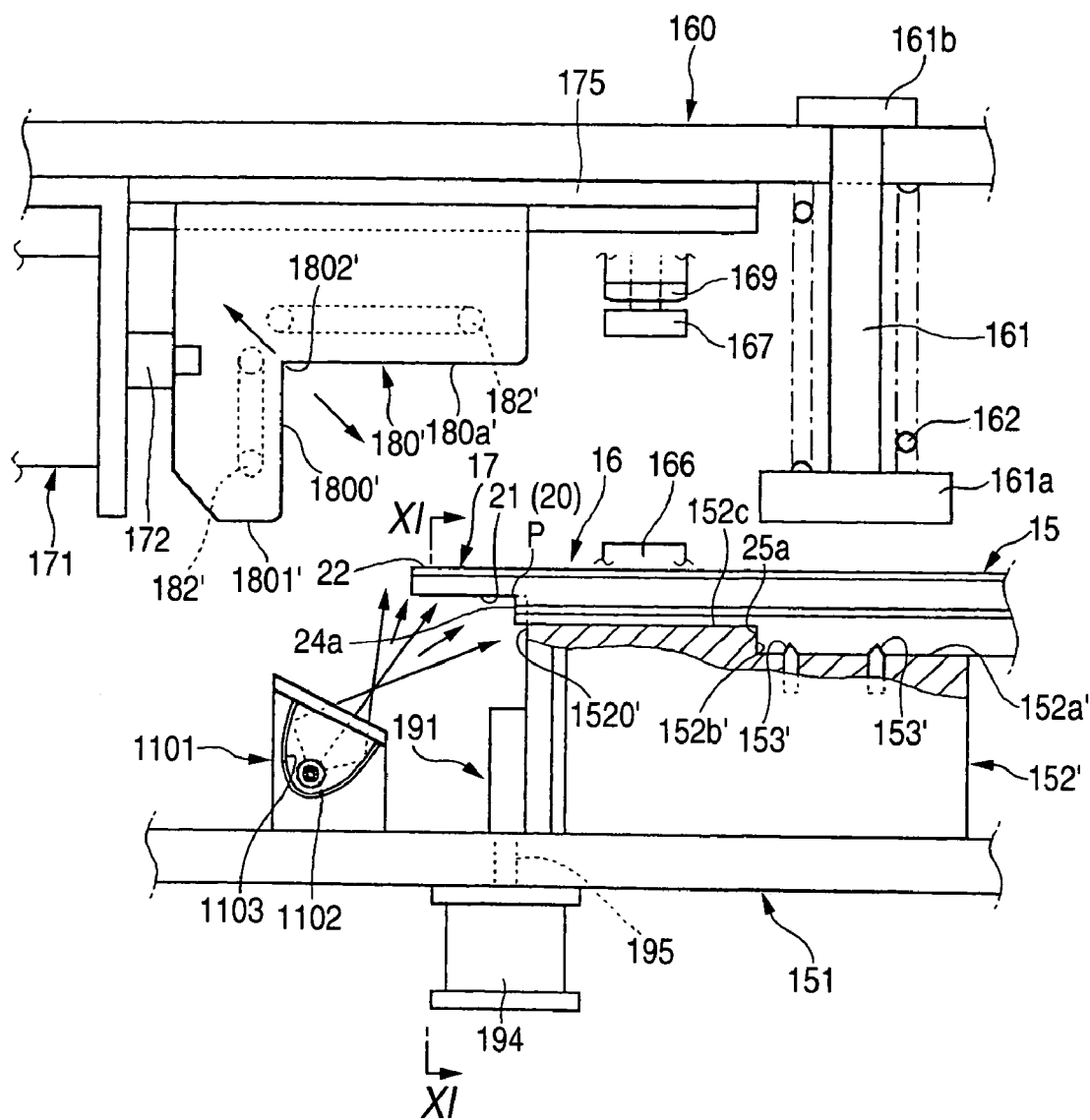
FIG. 22 is an explanatory view showing a state that the molding body is set to a fixed die.

As shown in FIG. 21 and FIG. 22, the first movable punch (upper mold) 180', which executes the mold closing and opening motions with respect to the fixed table 151 to apply the press working to the end portion 17 of the molding body 15 to thereby form the end bending portion 19, is arranged on one surface (lower surface) of the movable plate 160, which faces to the fixed table 151.

In this first movable punch 180', a forming surface 1800' for forming the surface side of the end cover portion 11 of the molding 10 as the final product and a sandwiching surface 180a' for constituting a surface that is in almost parallel with the surface of the molding body 15 and for cooperating with the fixed die 152' to sandwich the end portion neighborhood 16 of the molding body 15 between them when the first movable punch 180' is closed onto the fixed die 152' are coupled via an internal angle portion 1802', which is formed with a radius of curvature that is smaller than a radius of curvature of the linear end bending portion 19 of the molding body 15, to have a predetermined angle (angle of 90 degree in this embodiment).

Accordingly, a cavity 1110 is formed between both forming surfaces 1520', 1800' of the fixed die 152' and the first movable punch 180'. These forming surfaces 1520', 1800' form the end bending portion 19 by bending the end portion 17 of the molding body 15 at a predetermined bending angle E (almost right angle in this embodiment 1) when the first movable punch 180' is closed onto the fixed die 152'.

Also, the first movable punch 180' has a pushing top end portion 1801' that comes into contact with the top-end side portion of the end portion 17 of the molding body 15, which is set in the fixed die 152', when the first movable punch 180' is closed onto the fixed die 152' and bends such top-end side portion toward the back surface side.

As shown in FIG. 21 and FIG. 22, the first movable punch 180' is moved and guided by a guiding mechanism, which is constructed by guide rails 175 provided on one side surface of the movable plate 160, in the direction that is perpendicular to the forward and backward moving directions of the movable plate 160, i.e., in the lateral direction that is perpendicular to the vertical direction.

Also, the first movable punch 180' is moved forward and backward by a driving mechanism, which uses a motor, a fluid pressure cylinder, or the like as a driving source, in the direction that intersects with the forward and backward moving directions of the movable plate 160 at the time of the forward and backward motions of the movable plate 160 to execute the mold opening and closing motions with respect to the fixed die 152'. In other words, the first movable punch 180' is moved forward and backward in the oblique direction to the fixed die 152', which is the synthesized direction of the forward and backward moving directions of the movable plate 160 and the perpendicular direction to this direction, to execute the mold opening and closing motions. The first movable punch 180' can come up to the fixed die 152' and go away from the fixed die 152' in any direction by controlling speed of its forward and backward moving directions and the perpendicular direction to these directions.

In the embodiment 6, the driving mechanism of the first movable punch 180' includes an electric motor (e.g., servo motor) 171 as a driving source, and a feed shaft 172 moved by converting a rotational motion of the motor 171 into a linear motion. Then, a top end portion of the feed shaft 172 is coupled to the first movable punch 180'.

Also, the motor 171 is operated and controlled by a control unit 190 in such a way the first movable punch 180' is moved and controlled by a desired forward and backward moving amount in the direction, which intersects perpendicularly with the forward and backward moving directions of the movable plate 160, in response to a forward and backward moving amount of the movable plate 160. In this case, it is preferable that, if a large mold closing force is required when the first movable punch 180' is closed onto the fixed die 152a' feeding mechanism using a ball screw should be employed in place of the above mechanism as a mechanism to move the first movable punch 180', for the first movable punch 180' is never pushed back in the opposite direction to the moving direction at the time of closing the mold.

Figure 25:
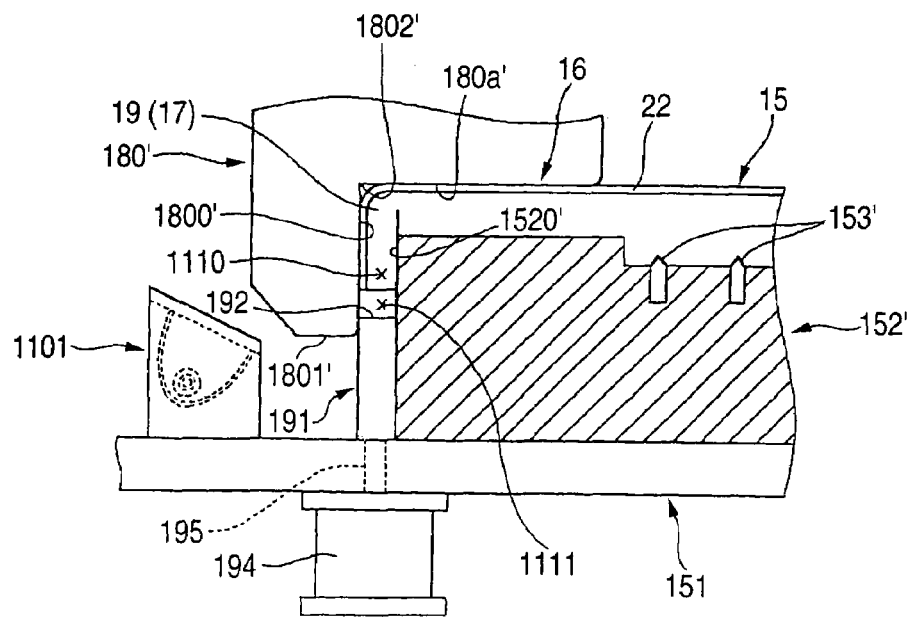
FIG. 25 is an explanatory view showing a state that the end portion of the molding body is bent at a predetermined angle to form an end bending portion.
Figure 26:
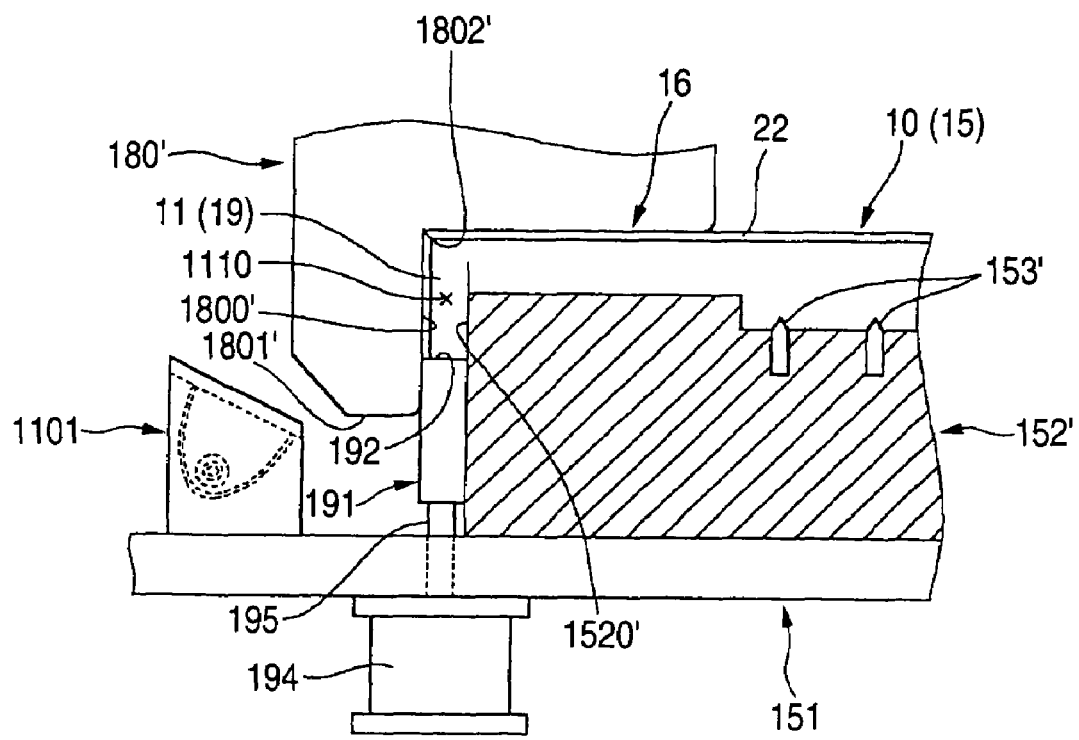
FIG. 26 is explanatory view showing a state that the end bending portion of the molding body is compressed by a second movable punch to form an end cover portion with a predetermined shape.

As shown in FIG. 25 and FIG. 26, the second movable punch 191 is provided at a predetermined position on the fixed table 151 to move forward and backward. This second movable punch 191 can increase and decrease a volume of the cavity 1110 that is formed between these forming surfaces 1520', 1800' of both molds 152', 180' when the first movable punch 180' is closed onto the fixed die 152'.

In the embodiment 6, the second movable punch 191 is formed as a flat plate that has the almost same plate thickness dimension as an interval dimension between these forming surfaces 1520', 1800' of both molds 152', 180' and has the almost same lateral width dimension as a lateral width dimension of the cavity 1110 when the first movable punch 180' is closed onto the fixed die 152'. Then, one side surface of the second movable punch 191 contacts the forming surface 1520' of the fixed die 152' and is moved forward and backward in the longitudinal direction of the end bending portion 19 while using the forming surface 1520' as a guiding surface and using the fluid pressure cylinder (the hydraulic cylinder, the air cylinder, or the like) 194 as the driving source. That is, a lower end portion of the second movable punch 191 is coupled to a top end of a cylinder rod 195 of the fluid pressure cylinder 194 and is moved forward and backward.

Also, in this embodiment 6, as shown in FIG. 25, when the first movable punch 180' is closed onto the fixed die 152', the top end (lower end) of the end bending portion 19 still remains in the cavity 1110 and the second movable punch 191 is provided to move forward into or backward from a remaining cavity portion 1111 that is opposed to the top end side of the end bending portion 19. Then, a pushing surface 192 at the top end of the second movable punch 191 pushes up the top end of the end bending portion 19 in response to the forward moving motion of the second movable punch 191 to apply a pushing force thereto, whereby the compressive force is applied to the material constituting the end bending portion 19.

Also, as shown in FIG. 21, a moving gauge axis 185 for measuring a forward and backward moving amount of the movable plate 160 is provided to one member of the fixed table 151 and the movable plate 160, while a sensor 186 for sensing a position of the moving gauge axis 185 is provided to the other member. Then, a sensed signal of the sensor 186 is supplied to the control unit 190, and then the motor 171 is operated and controlled based on the sensed signal according to a previously set program. That is, a moving locus of the first movable punch 180' is decided by the program.

In this case, a switching valve (solenoid valve) 187 provided to a hydraulic route, which is connected to the hydraulic cylinder to drive the press ram 158, is switched and controlled by the control unit 190 to lift up or bring down the press ram 158.

Also, refrigerant paths 182' through which the refrigerant is supplied to keep the first movable punch 180' at a constant temperature are provided to an inside of the movable punch 180' (see FIG. 22). Also, similarly the refrigerant paths are provided to an inside of the fixed die 152', but their illustration will be omitted herein.

A pushing means (stripper) for pushing a portion of the molding body 15 except the bent end portion 17 to be bent at a predetermined position to prevent a displacement in the longitudinal direction is provided to a predetermined position of the movable plate 160.

As shown in FIG. 22, this pushing means is passed through the predetermined position of the movable plate 160 to move forward and backward. This pushing means is constructed to include an axial pushing body 161 having a pushing plate 161a at its one end (lower end) and a stopper plate 161b at its other end (upper end), and a pushing spring 162 made of a compression coil spring provided around the pushing body 161 between the pushing plate and the movable plate 160 to elastically push the pushing body 161.

Also, as shown in FIG. 22, a stopper means for stopping the movable plate 160 at a forward end position (bottom dead center) is provided between the fixed table 151 and the movable plate 160.

In this embodiment 6, the stopper means includes a fixed stopper 166 fixed on the fixed table 151 side and an adjusting stopper 167 screwed detachably to the movable plate 160 side and fixed by a fastening nut 169 so that the adjusting stopper 167 can move to a desired position. Then, by allowing the adjusting stopper 167 to be disposed at an arbitrary position, the forward end position (bottom dead center) of the movable plate 160 is adjusted freely.

A heating device for heating and softening the end portion 17 of the molding body 15 that is set in the fixed die 1521 is provided on the fixed table 151 next to one side of the fixed die 152'. An infrared heating device is used as the heating device.

Also, the embodiment 6, a near infrared heating device 1101 is used as the infrared heating device.

As shown in FIG. 21 and FIG. 22, the near infrared heating device 1101 has a near infrared lamp (e.g., halogen lamp) 1102, and a reflecting mirror 1103 for converging the light emitted from the near infrared lamp 1102 and reflecting the light to form a focal point. As a result, the light emitted from the near infrared lamp 1102 can be irradiated only onto an area that is needed to heat the molding body 15, so that the heating of other portions can be prevented.

Also, the embodiment 6, a distance between the position of the end portion 17 of the molding body 15 that is set in the fixed die 152' and the near infrared lamp 1102 in the near infrared heating device 1101 is set such that the near infrared ray can be irradiated almost uniformly only to the to-be-heated area of the ornament body 21 of the molding main body 20 in the end portion 17 of the molding body 15 on the back surface side from the position that is far rather than a focal length of the reflecting mirror 1103. Therefore, the energy that is required of the heating can be employed effectively, and the light is not irradiated to the normal portion of the molding body 15 and the movable punch 180' that are not needed to heat, and thus the undesirable temperature rise can be prevented.

Also, it is preferable that the end portion 17 of the molding body 15 should be bent in a state that a temperature of the top end side is set lower than a temperature of a neighborhood of the bending center portion (in FIG. 22, a neighborhood of the bending center position P) and/or a hardness of the top end side is set higher than a hardness of the neighborhood of the bending center portion. Therefore, for example, it is desired that the end portion 17 should be heated and softened while maintaining a state that the temperature of the neighborhood of the top end portion of the end portion 17 of the molding body 15 is lower than the temperature of the neighborhood of the bending center position P.

Also, in the embodiment 6, when the near infrared ray is irradiated onto the back surface side of the ornament body 21 of the molding main body 20 in the end portion 17 of the molding body 15, the back surface of the ornament body 21 of the molding main body 20 is heated by the heat radiation while interrupting the irradiation of the near infrared ray with a lapse of time and changing an irradiation amount to increase and decrease alternately with a lapse of time, and the decorative layer 22 is heated almost uniformly by the thermal conduction.

For example, an irradiation amount of the near infrared ray can be changed to increase and decrease alternately with a lapse of time by controlling an output of the near infrared lamp 1102 to form a wave shape with a lapse of time, as shown in FIG. 12, or by ON/OFF-controlling a power supply of the near infrared lamp 1102 with a lapse of time, as shown in FIG. 13.

Next, a molding manufacturing method as well as an operation of the above molding manufacturing system will be explained as below with reference to FIG. 22 to FIG. 26.

Figure 23:
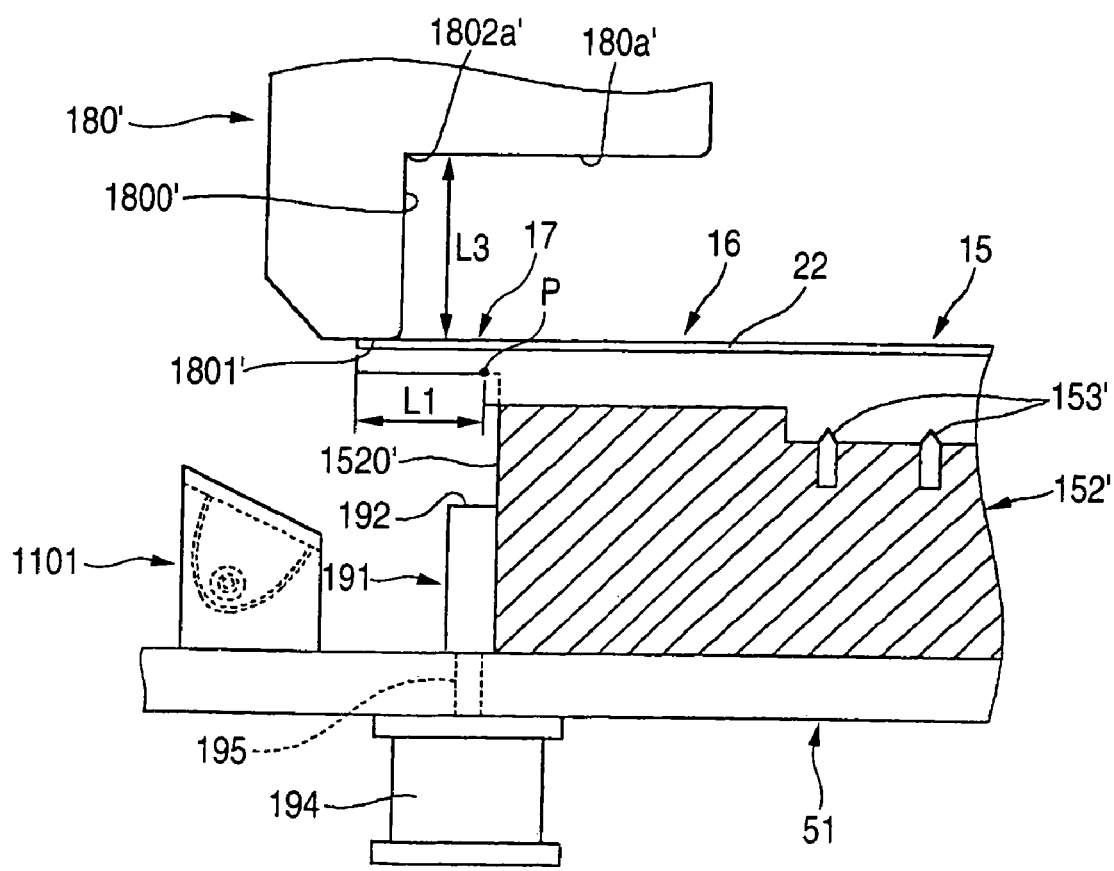
FIG. 23 is an explanatory view showing an initial state in which the first movable punch comes into contact with the end portion of the molding body.
Figure 24:
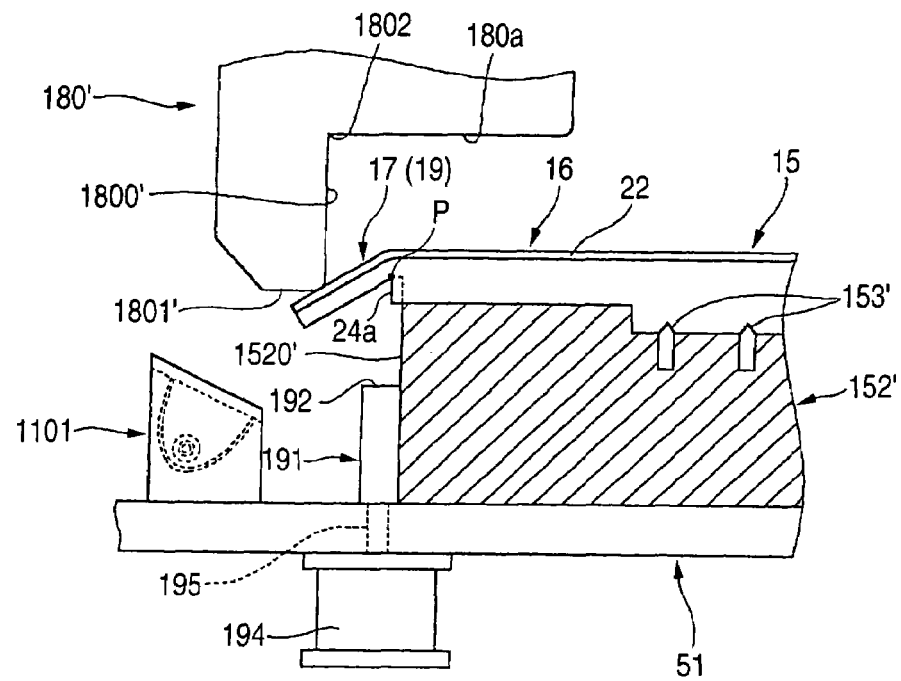
FIG. 24 is an explanatory view showing an intermediate state that the end portion of the molding body is bent by a pushing force of the first movable punch.

First, the longitudinally-extending molding body 15 having the linear end portion 17, a length L1 of which is set longer than a length L2 of the end cover portion 11 of the finally-formed molding 10 by a predetermined length and is set shorter than a length L3 of the forming surface 1800' of the first movable punch 180', is prepared (see FIGS. 4 and 23).

Then, in the state that, as shown in FIG. 22, the movable plate 160 is arranged at the retreat position and the movable punch 180' is opened, the supporting body 23 of the normal portion of the molding body 15 and an upper half portion of the leg portion 24 of the end portion neighborhood 16 are fitted into the first positioning groove 152a' and the second positioning groove 152c' of the fixed die 152' respectively, while bringing a stepped portion 152b' located at the boundary portion between the normal portion of the molding body 15 and the end portion neighborhood 16 into contact with the stepped portion 152b' between the first positioning groove 152a' and the second positioning groove 152c' of the fixed die 152' to position the molding body 15 in the longitudinal direction. At this time, the molding body is temporarily fixed and set by a plurality of positioning and fixing pins 153' that are provided on the bottom surface of the first positioning groove 152a'.

As described above, when the molding body 15 is set, the end portion 17 of the molding body 15 is set to protrude from one side of the fixed die 152', whereas an end surface of the leg portion 24 acting as a stepped portion 24a at the boundary portion between the end portion 17 and the end portion neighborhood 16 is projected slightly from one side of the fixed die 152'. Then, the stepped portion 24a, i.e., the end surface of the leg portion 24 is welded to the back surface of the end portion 17.

Then, the near infrared lamp 1102 of the near infrared heating device 1101 is turned on (ON). Then, the near infrared ray emitted from the near infrared lamp 1102 is irradiated onto the back surface side of the ornament body 21 of the molding main body 20 in the end portion 17 of the molding body 15 (see arrows indicated in FIG. 22 and FIG. 23). Then, it is preferable that the near infrared ray should be irradiated to have an irradiation width that almost coincides with a width of the end portion 17 or that is wider than the width of the end portion 17.

As a result, the end portion 17 of the molding body 15 is heated and softened to keep the condition that the decorative layer 22 has a softened level lower than the ornament body 21 of the molding main body 20 in the end portion 17 of the molding body 15.

Then, the movable plate 160 is moved forward to a forward (lower, in this case) end position by the press ram 158 during when the end portion 17 of the molding body 15 is still kept in the softened state after the irradiation of the near infrared ray is stopped.

First, the movable plate 160 is moved forward to a predetermined position, and also the pushing plate 161a of the pushing body 161 comes at first into contact with the decorative layer 22 of the molding body 15. The pushing spring 162 is compressed elastically by the subsequent forward moving motion of the movable plate 160, and then the molding body 15 is pushed against the fixed die 152' by a spring force of the pushing spring 162 via the pushing body 161. As a result, the positioning and fixing pins 153' encroach upon the bottom surface of the supporting body 23 of the molding body 15, so that the molding body 15 can be firmly fixed to the fixed die 152' not to displace in the longitudinal direction. At this point of time, the first movable punch 180' is moved to the position at which the underlying top end portion 1801' is overlapped with the overlying end portion 17 to hold a clearance between them.

Then, the movable plate 160 is moved further forward and also the motor 171 is operated. Then, the first movable punch 180' is moved forward by the feed shaft 172 in the direction that is perpendicular to the forward moving direction of the movable plate 160, i.e., the lateral direction that is perpendicular to the vertical direction in the embodiment 6.

As a result, the first movable punch 180' is moved forward in the oblique direction, which is the synthesized direction of the forward moving direction of the movable plate 160 and the direction perpendicular to such direction, to execute the mold closing motion with respect to the fixed die 1521.

The movable plate 160 is moved toward the forward end position at which the moving-late side stopper 167 comes into contact with the fixed stopper 166, and also the first movable punch 1801 is moved forward to the forward end position in the oblique direction, i.e., the mold closing position.

As shown in FIG. 23, when the first movable punch 180' is moved forward to a predetermined position, the top end portion 1801' of the first movable punch 180' is brought into contact with the portion near the top end portion of the end portion 17 of the molding body 15. Then, a pushing force of the first movable punch 180' is applied to the portion near the top end portion of the end portion 17 of the molding body 15. Thus, such end portion 17 of the molding body 15 is gradually bent downward (see FIG. 24).

Subsequently, as shown in FIG. 25, the first movable punch 180' is moved forward to the mold closing position. Accordingly, the end portion 17 of the molding body 15 is bent up to a predetermined bending angle θ (almost right angle) by the press working (bending), and also the end portion 17 is bent at an almost right angle in the cavity 1110 between the forming surface 1520' of the fixed die 152' and the forming surface 1800' of the first movable punch 180' to form the end bending portion 19. At this time, since the back surface near the root portion of the end portion 17 and the stepped portion 24a (end surface of the leg portion 24) at the boundary portion between the end portion 17 and the end portion neighborhood 16 are welded mutually, the event that the end bending portion (the end cover portion 11 of the molding 10 as the final product) 19 tends to return to its original shape can be further prevented.

As shown in FIG. 25, when the first movable punch 180' is closed onto the fixed die 152', the top end of the end bending portion 19 still remains in the cavity 1110 and neighborhood of the top end portion of the second movable punch 191 is positioned in the remaining cavity portion 1111 that is positioned on the top end side of the end bending portion 19.

Subsequently to the above bending, the second movable punch 191 is moved forward to the top end portion of the end bending portion 19 in the direction that a volume of the cavity 1110 is reduced, by using the fluid pressure cylinder 194, which is operated and controlled by the control unit 190, as the driving source while the end bending portion 19 is still softened.

As shown in FIG. 26, when the second movable punch 191 is moved forward to the position at which the pushing surface 192 at the top end of the second movable punch 191 comes into contact with the top end portion of the end bending portion 19, the pushing surface 192 at the top end of the second movable punch 191 pushes up the top end of the end bending portion 19 by the subsequent forward moving motion of the second movable punch 191 to apply the pushing force thereto. Accordingly, the compressive force is applied to the material constituting the end bending portion 19. Then, the second movable punch 191 is moved forward up to the predetermined forward end position, so that the molding 10 having the end cover portion 11 with a predetermined shape is manufactured.

Then, in the condition that the first movable punch 180' is closed, the end cover portion 11 is cooled and solidified and also the second movable punch 191 is moved backward to the original retreat position.

Then, the movable plate 160 and the first movable punch 180' are moved backward to their original retreat positions. Then, the molding 10 having the end cover portion 11 is released from the fixed die 152', whereby the steps of manufacturing the molding 10 as the final product are completed.

As described above, according to this embodiment 6, the compressive force is applied to the end bending portion 19 by causing the second movable punch 191 to move toward the direction that a volume of the cavity 1110 between both forming surfaces 1520', 1800' of the fixed die 152' and the first movable punch 180' is reduced. Accordingly, a part of the material constituting the end bending portion 19 is filled in the cavity 1110 in the compressed state and is pushed tightly against both forming surfaces 1520', 1800' of the fixed die 152' and the first movable punch 180', so that the end cover portion 11 having the good external appearance, onto front and back surfaces of which shapes of the forming surfaces 1520', 1800' are transferred, can be formed.

Since the end cover portion 11 is formed in this manner, occurrence of uneven distortion on the surface (the decorative surface, i.e., the surface of the decorative layer 22) of the end cover portion 11 can be prevented and thus the molding 10 having the end cover portion 11 that is good-looking and has a pleasing external appearance can be manufactured effectively.

In this embodiment 6, in this first movable punch 180', the forming surface 1800' used to form the surface side of the end cover portion 11 and the surface that is in almost parallel with the surface of the molding body 15, i.e., the sandwiching surface 180a' are connected continuously via the internal angle portion 1802', which is formed with a radius of curvature that is smaller than a radius of curvature of the end bending portion 19 of the molding body 15.

Therefore, when the end portion 17 of the molding body 15 is bent toward the back surface side by the forward moving motion of the first movable punch 180', such end portion 17 is bent upon the back surface side as the bending center (in FIG. 22, the bending center position P) and thus the surface side of the end portion 17 is extended in the longitudinal direction. Then, the surface side of the end bending portion 19 is bent with a radius of curvature that is larger than a radius of curvature of the internal angle portion 1802' of the first movable punch 180'. For this reason, a clearance is formed between the internal angle portion 1802' of the first movable punch 180' and the surface of the bent portion of the end bending portion 19 (see FIG. 25).

However, after the end bending portion 19 is formed in the cavity 1110 between both forming surfaces 1520', 1800' of the fixed die 152' and the first movable punch 180', the second movable punch 191 is moved so as to reduce a volume of the cavity 1110 during when at least the neighborhood of the bending center portion of the end bending portion 19 is kept in its fluid state. As a result, the compressive force is applied to the end bending portion 19 and then the material of the end bending portion 19 flows into the clearance on the inner side of the internal angle portion 1802' of the first movable punch 180' to fill it. Then, the material of the end bending portion 19 is cooled and solidified in this condition, whereby the end cover portion 11 having a sharp edge portion that coincides with a shape of the internal angle portion 1802' of the first movable punch 180' is formed.

Also, in this embodiment 6, the end portion 17 of the molding body 15 is bent in the situation that the temperature of the top end side of the end portion 17 of the molding body 15 is set lower than the temperature of the neighborhood of the bending center portion and/or the hardness of the top end side is set higher than the hardness of the neighborhood of the bending center portion. For example, in this embodiment 1, the end portion 17 of the molding body 15 is bent while maintaining the condition that the temperature near the top end portion of the end portion 17 of the molding body 15 is lower than the temperature of the neighborhood of the bending center position P. Hence, when the second movable punch 191 is moved forward and the pushing surface 192 at its top end comes into contact with the material of the top end of the end bending portion 19, the hardness of the top end side of the end bending portion 19 is kept high rather than the neighborhood of the center portion. Accordingly, leakage of the material in the neighborhood of the top end portion of the end bending portion 19 to the outside of the cavity 1110 can be prevented. In other words, the material of the end bending portion 19 can be compressed sufficiently, and thus the end cover portion 11 having a good-looking external appearance can be formed by preventing disadvantages caused due to lack of the compressive force.

Also, in this embodiment 1, when the molding body 15 is set in the fixed die 152' in the state that the end portion 17 of the molding body 15 is protruded from one side of the fixed die 152a' projection length L1 of the end portion 17 of the molding body 15 is set longer than a length L2 of the finally-formed end cover portion 11 and is set shorter than a length L3 of the forming surface 1800' of the first movable punch 180'. Therefore, as shown in FIG. 25, when the first movable punch 180' is closed onto the fixed die 152', the top end of the end bending portion 19 still remains in the cavity 1110. Then, the second movable punch 191 is moved forward into the remaining cavity portion 1111 positioned on the top end side of the end bending portion 19 to compress the material of the end bending portion 19.

In this fashion, the end bending portion 19 is formed by bending the end portion 17 of the molding body 15 in the cavity 1110 and then the second movable punch 191 is moved forward into the remaining cavity portion 1111 to compress the material of the end bending portion 19. As a result, the end bending portion 19 can be compressed effectively and also the end cover portion 11 can be formed satisfactorily.

Embodiment 7

Next, an embodiment 7 of the present invention will be explained with reference to FIG. 27 hereinafter.

Figure 27:
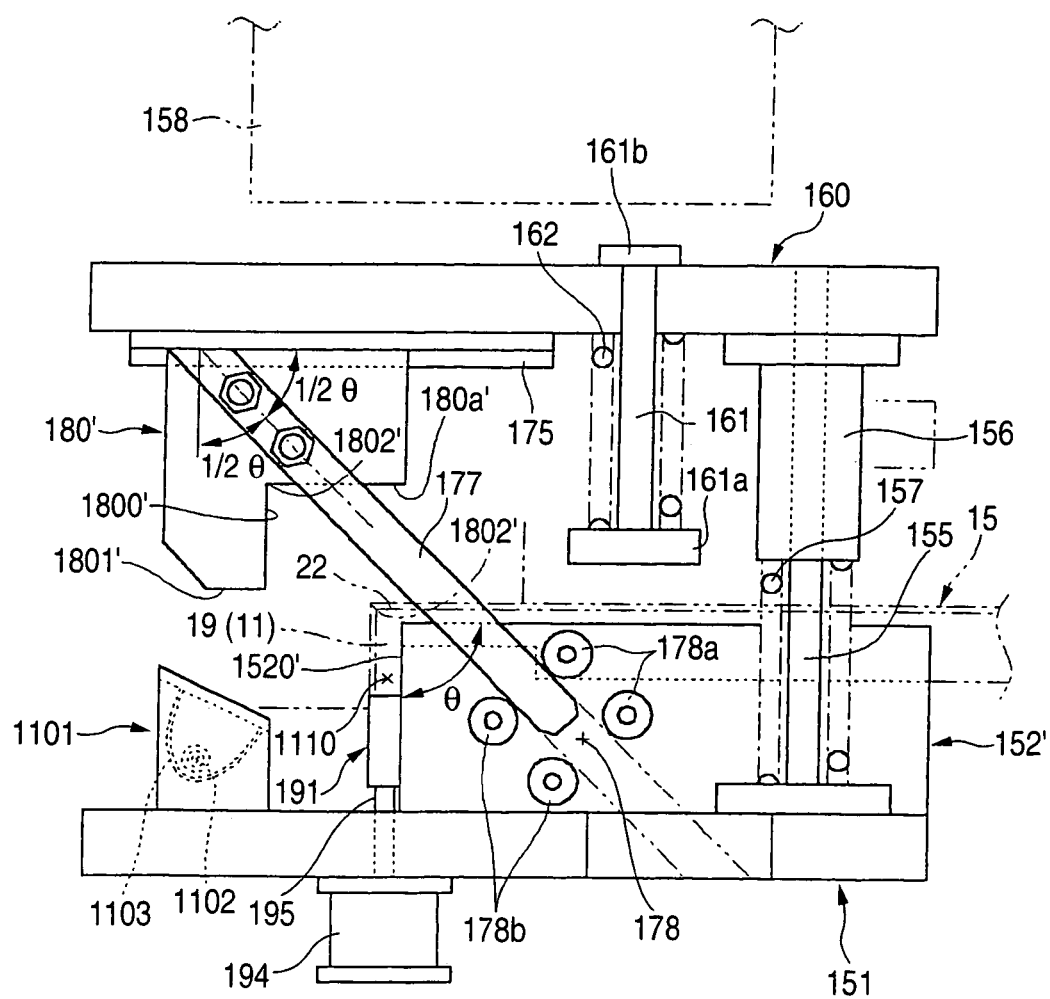
FIG. 27 is an explanatory view showing an embodiment 7 of the present invention wherein a first movable punch driving mechanism is constructed by a cam mechanism having a cam follower and a cam groove.

As shown in FIG. 27, the driving mechanism of the movable punch 180', which is moved and guided by the guiding mechanism using the guiding rails 175 provided to one side surface of the movable plate 160 in the direction that is perpendicular to the forward and backward moving directions of the movable plate 160 (e.g., lateral direction perpendicular to the vertical direction), is exchanged for a cam mechanism that is different from the embodiment 6.

More particularly, in an embodiment 7 of the present invention, a rod-like cam follower 177 is fixed to the side surface of the movable punch 180' in the oblique state whose angle is set to an angle ½·θ, where θ is a bending angle. In contrast, a plurality of rollers 178a, 178b are fitted to the side surface of the fixed die 152' to correspond to the cam follower 177. A cam groove 178 for guiding the cam follower 177 between these plural rollers 178a, 178b is formed. Then, the cam mechanism consists of the cam follower 177 and the cam groove 178.

Since other configurations of the embodiment 7 are constructed similarly to the embodiment 6, their explanation will be omitted herein by affixing the same reference symbols to the same constituent portions.

Therefore, in this embodiment 7, the end portion 17 of the molding body 15 is heated and softened by the near infrared heating device 1101 to maintain still the condition that the decorative layer 22 of the end portion 17 of the molding body 15 has the softened level lower than the ornament body 21 of the molding main body 20.

Then, when the movable plate 160 is moved forward to the forward end position by the press ram 158, the first movable punch 180' is also moved forward by a cam action executed by the cam follower 177 and the cam groove 178 in the oblique direction, which is the synthesized direction of the forward moving direction of the movable plate 160 and the direction perpendicular to such direction, to carry out the mold closing motion.

Accordingly, the end portion 17 of the molding body 15 is bent by the press working (bending) in the cavity 1110 between both forming surfaces 1520', 1800' of the fixed die 152' and the first movable punch 180' by a predetermined bending angle θ (almost right angle) to form the end bending portion 19. Then, like the embodiment 6, the second movable punch 191 is moved in the direction that reduces a volume of the cavity 1110 between both forming surfaces 1520', 1800' of the fixed die 152' and the first movable punch 180', to apply the compressive force to the end bending portion 19. As a result, a part of the material constituting the end bending portion 19 is filled while compressing in the cavity 1110 and is pushed tightly against both forming surfaces 1520', 1800' of the fixed die 152' and the first movable punch 180' and the internal angle portion 1802' of the first movable punch 180' respectively, whereby the end cover portion 11 having the pleasant external appearance is formed.

As described above, since the driving mechanism of the first movable punch 180' is constructed by the cam mechanism consisting of the cam follower 177 and the cam groove 178, it is possible to cause the first movable punch 180' to execute the precise repeating operation and also it is possible to simplify the structure of the molding manufacturing system.

In this case, it is preferable that the setting angle of the cam follower 177 should be set to ½·θ (e.g., 45 degree). But such setting angle of the cam follower 177 may be adjusted and set freely by changing appropriately a fitting position (fitting angle) of the cam follower 177 with respect to the first movable punch 180'.

Also, the cam follower 177 and the cam groove 178 may be provided in the opposite manner to the above embodiment 7, i.e., the cam follower 177 may be provided to the fixed die 152' and the cam groove 178 may be provided to the first movable punch 1801.

In this case, it is similar to the embodiment 6 that the moving locus of the first movable punch 180' is decided such that the first movable punch 180' is moved along the line with an angle ½·θ from the position immediately before the mold closing position to the mold closing position.

In this case, the molding manufacturing system according to the present invention is not limited to the above embodiments 1 to 5.

For example, in the above embodiments 1 to 5, the case where the near infrared heating device 101, the intermediate infrared heating device, or the far infrared heating device is used as the heating device is exemplified. But the heating device using the hot air (hot blast) may be used in addition to such infrared heating devices.

Figure 28:
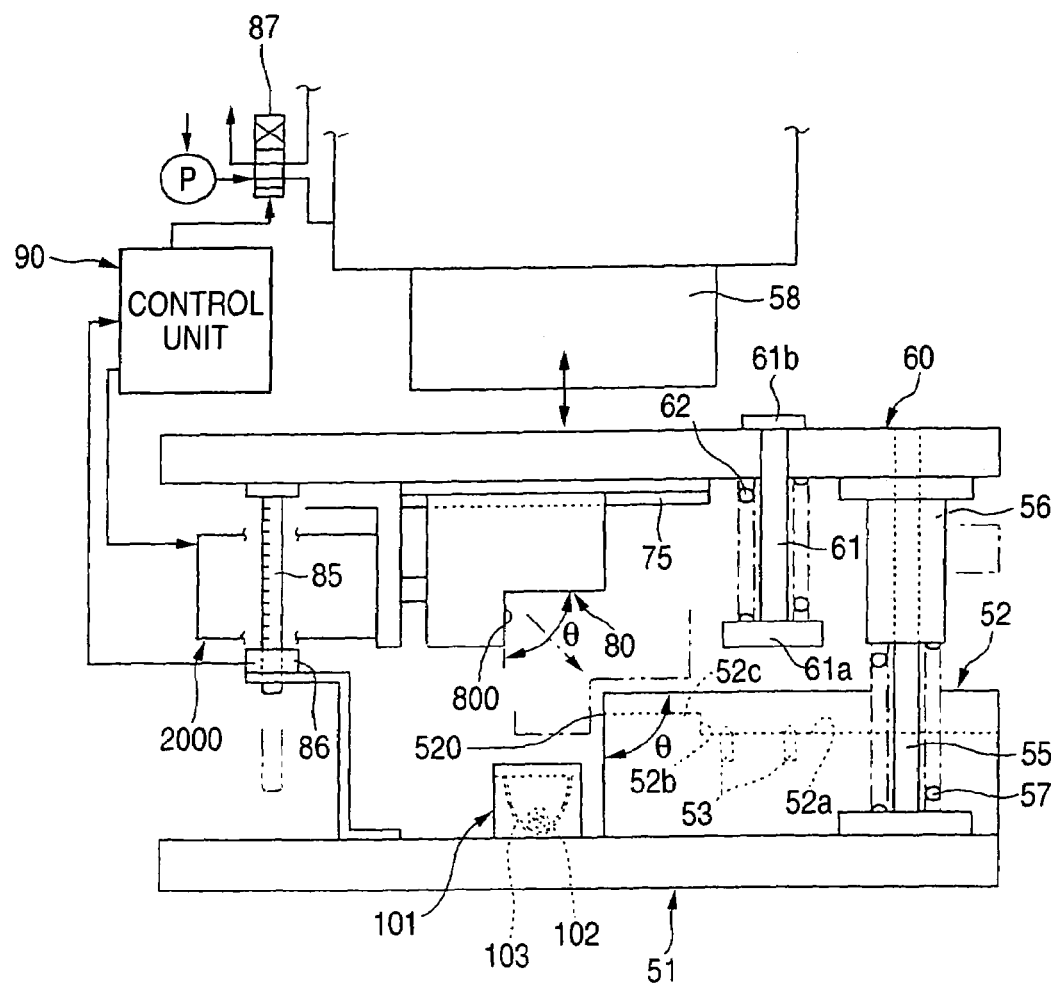
FIG. 28 is an explanatory view showing another embodiment of a configuration of the molding manufacturing system.

In the above embodiments 1 to 5, the motor 71 and the feed shaft 72 are used as a driving mechanism for actuating the movable punch 80. Instead, a fluid pressure cylinder 2000 may be used as the driving mechanism, as shown in FIG. 28.

Also, in the above embodiments 1 to 5, the case where the decorative layer 22 is provided along the longitudinal direction on the surface side, i.e., on the surface of the ornament body 21 in a layered fashion in the molding main body 20 constituting the main portion of the molding 10 (molding forming body) is exemplified. But the decorative layer 22 is provided as the case may be, and thus the structure without the decorative layer 22 may be employed.

Also, in the above embodiments 1 to 3, the case where the molding 10 corresponds to the roof molding is exemplified. But the molding manufacturing system of the present invention may be embodied if the molding such as the side protection molding, the bumper molding, or the like is employed in addition to the roof molding.

In the above embodiments 6 and 7, the structure that the first movable punch 180' is moved forward and backward in the oblique direction to the fixed die 152' is employed. But the end portion 17 of the molding body 15 may be bent by moving forward and backward the first movable punch 180' in the direction that is perpendicular to the longitudinal direction of the molding body 15 being set on the fixed die 152' (e.g., the vertical direction).

Also, in the above embodiments 6 and 7, the cases where the near infrared heating device 1101, the intermediate infrared heating device, and the far infrared heating device are used as the infrared heating device are exemplified. But the heating device using the hot air (hot blast) may be employed in addition to the infrared heating device.

Also, in the above embodiments 6 and 7, the case where the decorative layer 22 is provided in a layered fashion along the longitudinal direction of the surface of the ornament body 21 of the molding main body 20 constituting the main body portion of the molding 10 (molding body 15) is exemplified. But the decorative layer 22 is provided as the case may be, and thus the structure without the decorative layer 22 may be employed.

Also, in the above embodiments 6 and 7, the case where the molding 10 corresponds to the roof molding is exemplified. Even if the molding such as a side protection molding, a bumper molding, or the like is employed in addition to the roof molding, the molding manufacturing method of the present invention may be carried out.

As described above, according to the invention, the end cover portion can be formed by bending the end portion of the long molding body satisfactorily. Also, occurrence of uneven distortion, etc. on the decorative surface of the end cover portion and its neighborhood can be prevented.

According to the invention, the back surface side out of the molding main body in the end portion of the molding body is heated by the heat radiation, while the surface side (decorative layer side) is heated by the thermal conduction from the back surface. At this time, since the back surface side is never heated excessively, disadvantages such that the back surface of the molding body in the end portion of the molding body is heated excessively and melt away, a burn occurs, etc. can be prevented. As a result, the end cover portion can be shaped into the desired shape more satisfactorily.

According to the invention, the molding main body in the end portion of the molding body can be heated and softened quickly by the penetrating energy, which is one characteristic of the near infrared ray, from the back surface to the inner side. As a result, improvement in the productivity of the molding can be achieved by shortening the heating and softening time of the end portion of the molding body.

According to the invention, the molding main body can be heated and softened almost uniformly over the almost full length of the end portion of the molding body by employing the energy required for the heating effectively. Therefore, the disadvantage caused by nonuniformity of the softened level, e.g., the bending failure of the end portion of the molding body can be prevented.

According to the invention, the end cover portion can be formed by moving the second movable punch in the direction that reduces a volume of the cavity so as to push tightly the material constituting the end bending portion against the forming surface. Therefore, occurrence of uneven distortion, etc. on the surface (decorative surface) of the end cover portion can be prevented, and also the molding having the end cover portion with the pleasing external appearance can be manufactured effectively.

According to the invention, the end cover portion having a sharp edge portion, which coincides with a shape of the internal angle portion of the first movable punch, can be formed easily by pouring a part of material of the end bending portion of the molding body into a clearance, which is generated in the internal angle portion of the first movable punch, to bring tightly the material into contact with such clearance.

According to the invention, the material of the end bending portion can be compressed effectively by the forward moving motion of the second movable punch. Therefore, the molding having the end cover portion with the good-looking external appearance can be manufactured more effectively.

According to the invention, leakage of the material of the end bending portion near the top end portion to the outside of the cavity can be prevented. Therefore, the molding having the end cover portion with the pleasing external appearance can be formed by preventing the disadvantage caused by lack of the compressive force of the material of the end bending portion.

According to the invention, the material of the end bending portion is compressed by moving forward the second movable punch into the remaining cavity portion. Therefore, the end bending portion can be compressed effectively and thus the end cover portion can be formed satisfactorily.

According to the invention, the end cover portion having the sharp edge portion, which coincides with a shape of the internal angle portion of the first movable punch, can be formed easily.

According to the invention, dedicated guiding members for guiding forward and backward the second movable punch can be omitted, and thus reduction in cost can be achieved by simplifying the mold structure correspondingly.

According to the invention, the time and labor for heating the end portion of the molding body previously at another place (by separate steps) can be eliminated, and also the disadvantages caused by the unexpected deformation of the end portion that is softened by the heating do not occur.

What is claimed is:

1. A molding manufacturing method, comprising:
  preparing a co-extruded long molding body including a molding main body made of thermoplastic material and a decorative layer higher than the molding main body in hardness and melt temperature, so that the decorative layer is provided along a longitudinal direction of the molding main body on a surface thereof;
  setting the molding body in a fixed die such that a back surface side of said co-extruded long molding body which is opposite of said decorative layer faces said fixed die;
  heating and softening an end portion of the molding body while maintaining a condition in which the decorative layer is harder than the molding main body, by irradiating an infrared ray onto a back surface of the molding main body corresponding to the end portion of the molding body; and
  press forming the end portion of the molding body, while maintaining a condition in which the decorative layer is harder than the molding main body, by pressing a movable punch onto the fixed die while the end portion of the molding body is in a heated and softened state to bend the end portion of the molding body to obtain an end cover portion having a predetermined shape,
  wherein said press forming is performed in an oblique direction with respect to the longitudinal direction of the molding, so that the decorative layer of the end portion moves closer to the fixed die.

2. The molding manufacturing method according to claim 1, wherein, in the heating and softening step, an irradiation amount of the infrared ray onto the back surface of the molding main body is made alternately increase and decrease with a lapse of time.

3. The molding manufacturing method according to claim 1,
  wherein in the heating and softening step, a near infrared ray is irradiated by the use of a near infrared heating device.

4. The molding manufacturing method according to claim 3,
  wherein the near infrared heating device includes a near infrared lamp and a reflecting mirror for reflecting the near infrared ray emitted from the near infrared lamp to form a focal point; and
  the near infrared ray is irradiated substantially uniformly onto the back surface of the molding main body from a position separated farther than a focal length of the reflecting mirror.

5. A molding manufacturing method, comprising:
  preparing a co-extruded long molding body including a molding main body made of thermoplastic material and a decorative layer higher than the molding main body in hardness and melt temperature, so that the decorative layer is provided along a longitudinal direction of the molding main body on a surface thereof;

setting the molding body in a fixed die such that a back surface side of said co-extruded long molding body which is opposite of said decorative layer faces said fixed die;

heating and softening an end portion of the molding body while maintaining a condition in which the decorative layer is harder than the molding main body; and press forming the end portion of the molding body, while maintaining a condition in which the decorative layer is harder than the molding main body, by moving the movable punch obliquely toward the fixed die along a predetermined path such that the movable punch fits with the fixed die at an end of the path, to bend the end portion of the molding body, wherein said press forming is performed in an oblique direction with respect to the longitudinal direction of the molding, so that the decorative layer of the end portion moves closer to the fixed die.

6. The molding manufacturing method according to claim 5, wherein the press forming step includes fixing the molding body in a longitudinal direction thereof in the fixed die.

7. The molding manufacturing method according to claim 5, wherein in the press forming step, the predetermined path is set as a line which divides a bending angle of the fixed die into halves.

8. The molding manufacturing method according to claim 5, wherein in the press forming step, the predetermined path is set as a nonlinear path.

9. The molding manufacturing method according to claim 8, wherein the nonlinear path is separate from a line dividing a bending angle of the fixed die into halves, except in the vicinity of a position where the movable punch fits with the fixed die.

10. The molding manufacturing method according to claim 5, wherein in the press forming step, the fixed die and the movable punch is kept at a constant temperature cooler than the temperature of the end portion.

11. The molding manufacturing method according to claim 5, further comprising: trimming an end of the bent end portion.

12. The molding manufacturing method according to claim 5, wherein in the press forming step, the end portion is bent while slightly compressed between a forming surface of the fixed die and a forming surface of the movable punch.

13. A molding manufacturing method, comprising:

co-extruding a molding body, made of a thermoplastic material including a molding main body, a leg portion and a pair of protruding portions, and a thermoplastic decorative layer harder than the molding main body, the leg portion protruding from a back surface of the molding main body, the pair of protruding portions each protruding from one of both sides of the leg portion in a width direction of the molding main body;

cutting the molding body into a cut piece having a predetermined length;

removing the protruding portions from a back side of an end portion of the cut piece to form a first region thereon;

removing the leg portion to form a second region consecutive with a distal side of the first region to form a step between the first region and the second region on the back side;

positioning the cut piece in a longitudinal direction thereof by bringing the step into contact with the fixed die;

setting the molding body in the fixed die such that a back side surface of said co-extruded molding body which is opposite of said decorative layer faces said fixed die;

heating and softening an end portion of the cut piece while maintaining a condition in which the decorative layer is harder than the molding main body, by irradiating an infrared ray onto a back surface of the molding main body corresponding to the end portion of the molding body; and press forming the second region of the end portion of the cut piece by pressing a movable punch onto the fixed die while the end portion of the cut piece is in a heated and softened state to bend the second region of the end portion of the cut piece to obtain an end cover portion having a predetermined shape, wherein said press forming is performed while maintaining a condition in which the decorative layer is harder than the molding main body, and wherein said press forming is performed in an oblique direction with respect to the longitudinal direction of the molding, so that the decorative layer of the end portion moves closer to the fixed die.

14. The molding manufacturing method according to claim 13, wherein the step of extrusion molding includes embedding a core material having a rigidity larger than that of the molding main body into the leg portion;

the step of removing the leg portion includes removing the core material to obtain the main body portion without the core material in the second region; and in the step of press forming the second region of the end portion of the cut piece, the main body portion without the core material is bent.

15. A molding manufacturing method for manufacturing a molding having an end cover portion shaped in a predetermined shape out of a co-extruded long molding body, comprising preparing a molding apparatus including a fixed die, a first movable punch to be used to close the fixed die, and a second movable punch, the fixed die having a back forming surface for forming a back surface of the end cover portion, the first movable punch having a sandwiching portion integrally formed with a front forming surface for forming a front surface of the end cover portion, and the second movable punch capable of changing a volume of a cavity formed between the front forming surface and the back forming surface;

setting the molding body in the fixed die in a state that an end portion of the molding body protrudes from an end of the fixed die such that a back surface side of said co-extruded long molding body which is opposite of a decorative layer faces said fixed die;

heating and softening the end portion; moving the first movable punch to close the fixed die therewith, while bringing the first movable punch into contact with the end portion to bend the end portion in a back surface side thereof, to form an end bending portion in the cavity; and moving the second movable punch forward while the first movable punch is closed so as to reduce the volume of the cavity to be filled with a material and to apply a compressive force to the end bending portion to press said material forming the end bending portion closely onto the front forming surface of the first movable punch and the back forming surface of the fixed die, while keeping the vicinity of a bending center portion of the end bending portion in a fluid state, wherein said first movable punch is moved in an oblique direction with respect to a longitudinal direction of the molding, so that the decorative layer of the end portion moves closer to the fixed die.

16. The molding manufacturing method according to claim 15,
wherein the first movable punch has an internal angle portion formed continuously with the front forming surface and having a radius of curvature smaller than a radius of curvature of a surface of the end bending portion.

17. The molding manufacturing method according to claim 15,
wherein the step of moving the second movable punch includes moving forward the second movable punch from a distal end of the end bending portion in a direction to shorten a length of the end bending portion.

18. The molding manufacturing method according to claim 15,
wherein, in the step of moving the first movable punch, the end portion is bent while a temperature of a distal end of the end bending portion is reduced than a temperature of a bending center of the end portion.

19. The molding manufacturing method according to claim 15,
wherein, in the step of moving the first movable punch, the end portion is bent while a hardness of a distal end of the end bending portion is made higher than a hardness of a bending center of the end portion.

20. The molding manufacturing method according to claim 15,
wherein, in the setting step, the protruding end portion of the molding body is set longer than a length of the end cover portion to be finally formed and shorter than a length of the front forming surface of the first movable punch;
in the step of moving the first movable punch, the first movable punch closes the fixed die so that an end of the end bending portion remains in the cavity; and,
in the step of moving the second movable punch, the second movable punch is moved toward a part of the cavity opposing to the end of the end bending portion.

* * * * *